(12) United States Patent
Yoon et al.

(10) Patent No.: US 9,883,447 B2
(45) Date of Patent: Jan. 30, 2018

(54) COMMUNICATION METHOD AND APPARATUS SUPPORTING SELECTIVE COMMUNICATION SERVICES

(71) Applicant: Samsung Electronics Co., Ltd., Suwon-si, Gyeonggi-do (KR)

(72) Inventors: Su Ha Yoon, Seoul (KR); Sung Ho Son, Daegu (KR); Heung Sik Shin, Jeonju-si (KR); Jae Woong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 14/570,439

(22) Filed: Dec. 15, 2014

(65) Prior Publication Data

US 2015/0223145 A1     Aug. 6, 2015

(30) Foreign Application Priority Data

Feb. 6, 2014  (KR) .................. 10-2014-0013572

(51) Int. Cl.
*H04W 64/00* (2009.01)
*H04W 48/04* (2009.01)
*H04W 48/16* (2009.01)

(52) U.S. Cl.
CPC ......... *H04W 48/04* (2013.01); *H04W 64/006* (2013.01); *H04W 48/16* (2013.01); *H04W 64/003* (2013.01)

(58) Field of Classification Search
None
See application file for complete search history.

(56) References Cited

U.S. PATENT DOCUMENTS

| 8,472,973 | B2 | 6/2013 | Lin et al. | |
|---|---|---|---|---|
| 8,885,570 | B2 | 11/2014 | Lee | |
| 2004/0165548 | A1* | 8/2004 | Backes | H04L 47/125 370/328 |
| 2006/0160540 | A1* | 7/2006 | Strutt | G01S 11/06 455/440 |
| 2007/0087756 | A1* | 4/2007 | Hoffberg | G06Q 10/0631 455/450 |
| 2008/0069065 | A1* | 3/2008 | Wu | H04W 36/08 370/340 |

(Continued)

FOREIGN PATENT DOCUMENTS

| WO | WO 2013025168 A1 * | 2/2013 | ............ H04W 36/34 |
|---|---|---|---|
| WO | WO 2013158866 A1 * | 10/2013 | ......... G05D 23/1932 |

*Primary Examiner* — Chi H Pham
*Assistant Examiner* — Vladislav Agureyev
(74) *Attorney, Agent, or Firm* — Jefferson IP Law, LLP

(57) ABSTRACT

A method for controlling an electronic device and an apparatus therefor are provided. The method includes recognizing an access point located within a threshold range in which signals are transmittable/receivable from the electronic device, in order to connect the electronic device to an external network, determining whether the electronic device is currently moved in relation to the electronic device based on information related to at least one of the access point and the external network, and deciding on whether to prevent connection of the electronic device to the access point based on a result of the determining whether the access point is currently moved in relation to the electronic device.

27 Claims, 18 Drawing Sheets

(56) References Cited

U.S. PATENT DOCUMENTS

| | | | |
|---|---|---|---|
| 2009/0219900 A1* | 9/2009 | Kokkinen | B61L 15/0027 370/338 |
| 2011/0039575 A1* | 2/2011 | Castillo | H04W 64/003 455/456.1 |
| 2011/0264940 A1 | 10/2011 | Lin et al. | |
| 2012/0129532 A1* | 5/2012 | Lim | H04W 36/32 455/437 |
| 2012/0322449 A1* | 12/2012 | Shimizu | H04W 36/24 455/436 |
| 2013/0005291 A1* | 1/2013 | Geary | G06F 1/3209 455/404.1 |
| 2013/0122851 A1* | 5/2013 | Michaelis | H04W 76/007 455/404.2 |
| 2013/0122931 A1* | 5/2013 | Mitsuya | H04W 64/003 455/456.1 |
| 2013/0130686 A1* | 5/2013 | Ikeda | H04W 48/16 455/435.1 |
| 2013/0210428 A1* | 8/2013 | Manna | H04W 52/0245 455/434 |
| 2013/0267242 A1* | 10/2013 | Curticapean | G01S 5/0242 455/456.1 |
| 2013/0267270 A1* | 10/2013 | Cheng | H04W 84/005 455/524 |
| 2013/0344859 A1* | 12/2013 | Abramson | G06Q 50/265 455/418 |
| 2014/0003261 A1* | 1/2014 | Glllett | H04W 48/04 370/252 |
| 2014/0010221 A1 | 1/2014 | Panian et al. | |
| 2014/0010224 A1 | 1/2014 | Lee | |
| 2014/0010225 A1 | 1/2014 | Puregger | |
| 2014/0011517 A1 | 1/2014 | Lin et al. | |
| 2014/0012412 A1 | 1/2014 | Khonalkar et al. | |
| 2014/0013271 A1 | 1/2014 | Moore et al. | |
| 2014/0013361 A1 | 1/2014 | Monari et al. | |
| 2014/0120955 A1* | 5/2014 | Padden | H04W 36/00 455/456.6 |
| 2014/0247807 A1* | 9/2014 | Westerberg | H04W 36/34 370/331 |
| 2014/0321380 A1* | 10/2014 | Zhang | H04W 48/20 370/329 |
| 2015/0105097 A1* | 4/2015 | Sun | H04W 64/003 455/456.1 |
| 2015/0131483 A1* | 5/2015 | Colban | H04W 48/16 370/254 |
| 2015/0215851 A1* | 7/2015 | Sivavakeesar | H04W 24/02 455/434 |
| 2015/0245280 A1* | 8/2015 | Zhou | H04W 36/32 455/434 |

* cited by examiner

COMMUNICATION METHOD AND APPARATUS SUPPORTING SELECTIVE COMMUNICATION SERVICES

CROSS-REFERENCE TO RELATED APPLICATION(S)

This application claims the benefit under 35 U.S.C. §119 (a) of a Korean patent application filed on Feb. 6, 2014 in the Korean Intellectual Property Office and assigned Serial number 10-2014-0013572, the entire disclosure of which is hereby incorporated by reference.

TECHNICAL FIELD

The present disclosure relates to a communication method and device, for example, a radio communication method and device.

BACKGROUND

Radio communication is performed using electromagnetic waves or ultrasonic waves. There are various technologies for radio communication, such as a wireless LAN in which communication is performed within a certain distance from an access point. Since cables are not used for radio communication, user devices such as electronic devices (for example, cell phones, tablet computers, and personal computers (PCs)) that support radio communication may access a network through a wireless access device while moving within the range of radio waves.

When an electronic device detects a plurality of Access Points (APs), for example, two APs, the electronic device may compare signal strengths (e.g., Received Signal Strength Indicator (RSSI) values) of the APs so as to be connected to an AP having a higher signal strength. Therefore, if an AP having a higher signal strength than that of a previously connected AP approaches the electronic device, the electronic device may be disconnected from the previously connected AP and then may be connected to the new adjacent AP even if a user does not desire the new connection. For example, at a place such as a bus stop, the connection of the electronic device to an AP may be reconfigured due to an AP installed in a bus that approaches the bus stop.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a communication method and device.

In accordance with an aspect of the present disclosure, a method for controlling an electronic device is provided. The method includes recognizing an Access Point (AP) located within a specified range in which signals are transmittable/receivable from the electronic device, in order to connect the electronic device to an external network, determining whether the access point is currently moved based on information related to at least one of the access point and the external network, and deciding whether to connect the electronic device to the access point based on a result of the determining of whether the access point is currently moved.

In accordance with an aspect of the present disclosure, an electronic device is provided. The electronic device includes a module for recognizing an access point located within a specified range in which signals are transmittable/receivable from the electronic device, in order to connect the electronic device to an external network, a module for determining whether the access point is currently moved based on information related to at least one of the access point and the external network, and a module for deciding whether to connect the electronic device to the access point based on a result of the determining of whether the access point is currently moved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
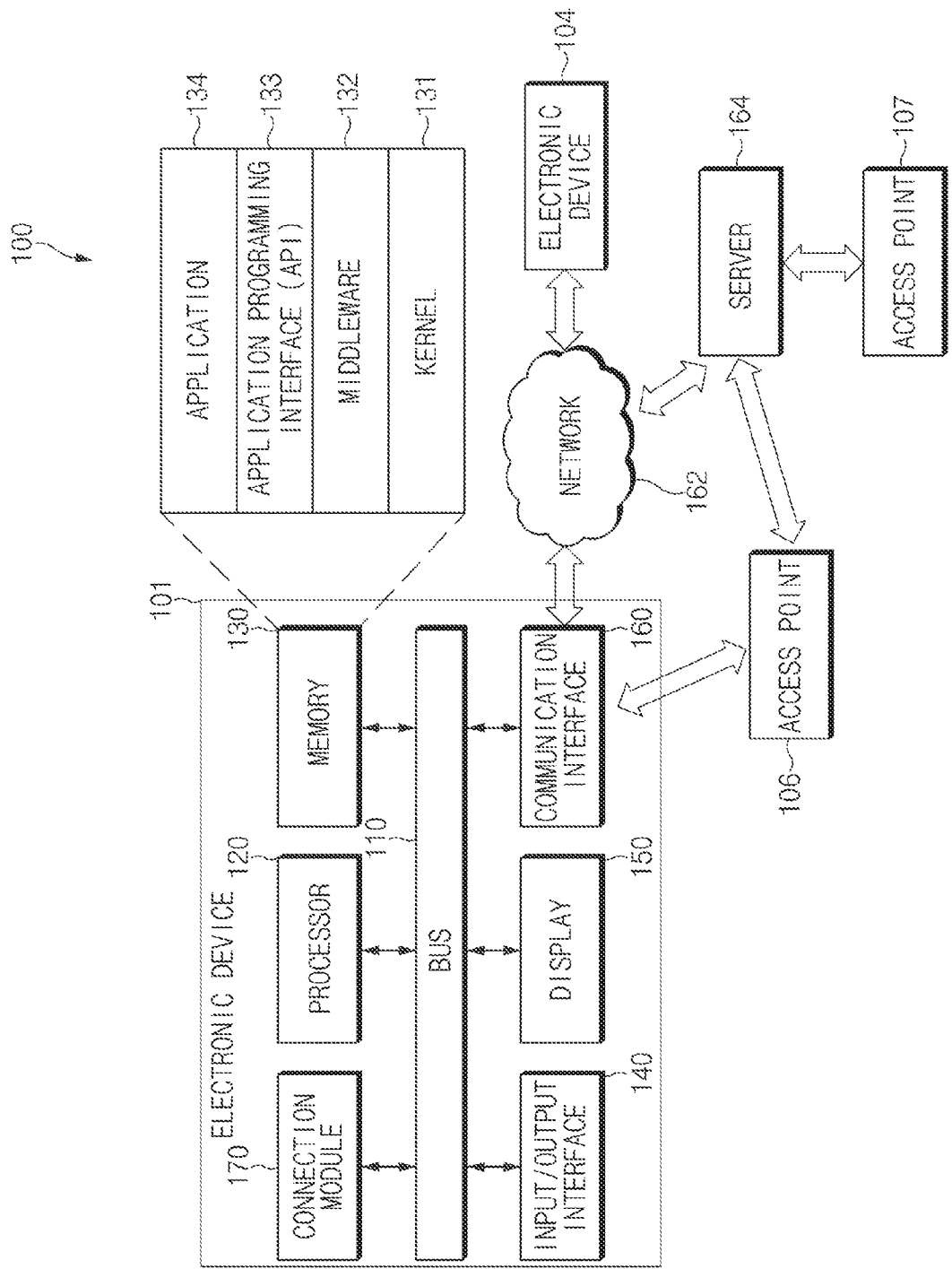
FIG. 1 is a schematic block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising" used herein indicates disclosed functions, operations, or existence of elements but does not exclude other functions, operations or elements. It will be further understood that the terms "comprises", "comprising,", "includes" and/or "including", when used herein, specify the presence of stated features, integers, operations, elements, and/or components, but do not preclude the presence or addition of one or more other features, integers, operations, elements, components, and/or groups thereof The meaning of the term "or" used herein includes any combination of the words connected by the term "or". For example, the expression "A or B" may indicate A, B, or both A and B.

The terms such as "first", "second", and the like used herein may refer to various elements of various embodiments, but do not limit the elements. For example, such terms do not limit the order and/or priority of the elements. Furthermore, such terms may be used to distinguish one element from another element. For example, "a first user device" and "a second user device" indicate different user devices. For instance, without departing the scope of the present disclosure, a first element may be named as a second element, and similarly, a second element may be named as a first element.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is not for delimiting the present disclosure but for describing specific various embodiments. The terms of a singular form may include plural forms unless otherwise specified.

The terms used herein, including technical or scientific terms, have the same meanings as understood by those skilled in the art. It will be further understood that terms in common usage should also be interpreted as is customary in the relevant art and not in an idealized or overly formal sense unless expressly so defined herein.

An electronic device according to the present disclosure may include a communication function. For example, the electronic devices may include at least one of smartphones, tablet Personal Computers (PCs), mobile phones, video telephones, electronic book readers, desktop PCs, laptop PCs, network computers, Personal Digital Assistants (PDAs), Portable Multimedia Players (PMPs), MP3 players, mobile medical devices, cameras, wearable devices (e.g., Head-Mounted-Devices (HMDs) such as electronic glasses), electronic apparel, electronic bracelets, electronic necklaces, electronic appcessories, electronic tattoos, and smart watches.

According to some various embodiments, electronic devices may be smart home appliances having communication functions. The smart home appliances may include at least one of, for example, TVs, DVD players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, and electronic picture frames.

According to various embodiments, electronic devices may include at least one of medical devices (e.g., Magnetic Resonance Angiography (MRA), Magnetic Resonance Imaging (MRI), Computed Tomography (CT), scanners, and ultrasonic devices), navigation devices, Global Positioning System (GPS) receivers, Event Data Recorders (EDRs), Flight Data Recorders (FDRs), vehicle infotainment devices, electronic equipment for vessels (e.g., navigation systems and gyrocompasses), avionics, security devices, head units for vehicles, industrial or home robots, Automatic Teller Machines (ATMs), and Points Of Sale (POSs).

According to various embodiments, electronic devices may include at least one of parts of furniture or buildings/structures having communication functions, electronic boards, electronic signature receiving devices, projectors, and measuring instruments (e.g., water meters, electricity meters, gas meters, and wave meters). Electronic devices according to the present disclosure may be one or more combinations of the above-mentioned devices. Furthermore, electronic devices according to the present disclosure may be flexible devices. In addition, it would be obvious to those skilled in the art that electronic devices according to the present disclosure are not limited to the above-mentioned devices.

Hereinafter, electronic devices according to various embodiments will be described with reference to the accompanying drawings. The term "user" used herein may refer to a person who uses an electronic device or may refer to a device (e.g., an artificial electronic device) that uses an electronic device.

FIG. 1 illustrates a network environment 100 including an electronic device 101 according to an embodiment of the present disclosure.

Referring to FIG. 1, the electronic device 101 may include a bus 110, a processor 120, a memory 130, an input/output interface 140, a display 150, a communication interface 160, and a connection module 170. The bus 110 may be a circuit for connecting the above-mentioned elements to each other and for communication (e.g., control message transfer) between the above-mentioned elements.

The processor 120 may receive a command from another element (e.g., the memory 130, the input/output interface 140, the display 150, the communication interface 160, or the connection module 170) through the bus 110, may interpret the received command, and may perform an operation or data processing according to the interpreted command.

The memory 130 may store a command or data received from or generated by the processor 120 or another element (e.g., the input/output interface 140, the display 150, the communication interface 160, or the connection module 170). The memory 130 may include programming modules such as a kernel 131, middleware 132, an Application Programming Interface (API) 133, or an application 134. Each programming module may include software, firmware, hardware, or a combination of at least two thereof.

The kernel 131 may control or manage system resources (e.g., the bus 110, the processor 120 or the memory 130) used to perform an operation or function of another programming module, for example, the middleware 132, the API 133 or the application 134. Furthermore, the kernel 131 may provide an interface for the middleware 132, the API 133, or the application 134 to access individual elements of the electronic device 101 in order to control or manage the elements.

The middleware 132 may mediate between the API 133 or application 134 and the kernel 131 so that the API 133 or application 134 communicates and exchanges data with the kernel 131. Furthermore, the middleware 132 may perform a control operation (e.g., scheduling or load balancing with respect to operation requests received from the application 134 by using, e.g., a method of assigning a priority for using system resources (e.g., the bus 110, the processor 120, or the memory 130) of the electronic device 101 to at least one application 134.

The API 133, which is an interface for the application 134 to control a function provided by the kernel 131 or middleware 132, may include at least one interface or function (e.g., a command) for, for example, file control, window control, image processing, or character control.

According to various embodiments of the present disclosure, the application 134 may include an Short Message Service (SMS)/Multimedia Messaging Service (MMS) application, an electronic mail application, a calendar application, an alarm application, a health care application (e.g., an application for measuring an amount of exercise or blood sugar), or an environment information application (e.g., an application for providing atmospheric pressure, humidity or temperature information). Additionally or alternatively, the application 134 may be an application related to information exchange between the electronic device 101 and an external electronic device (e.g., an electronic device 104). The application related to information exchange may include, for example, a notification relay application for transferring specific information to the external electronic device or a device management application for managing the external electronic device.

For example, the notification relay application may include a function of transferring notification information generated by another application (e.g., an SMS/MMS application, an electronic mail application, a health care application or an environment information application) to an external electronic device (e.g., the electronic device 104). Additionally or alternatively, the notification relay application may receive notification information from an external electronic device (e.g., the electronic device 104) and may provide the notification information to a user. The device management application may manage (e.g., install, uninstall or update) a function (e.g., turning on/off an external electronic device (or a component thereof) or adjusting brightness (or resolution) of a display) of at least a part of the external device (e.g., the electronic device 104), an application operated in the external electronic device, or a service (e.g., a call service or a messaging service) provided from the external electronic device.

According to various embodiments of the present disclosure, the application 134 may include a designated application according to an attribute (e.g., the type of an electronic device) of the external electronic device (e.g., the electronic device 104). For example, if the external electronic device is an MP3 player, the application 134 may include an application related to playback of music. Similarly, if the external electronic device is a mobile medical device, the application 134 may include an application related to health care. According to an embodiment, the application 134 may include at least one of an application designated for the electronic device 101 and an application received from an external electronic device (e.g., a server 164 or the electronic device 104).

The input/output interface 140 may transfer a command or data input by a user through an input/output device (e.g., a sensor, a keyboard or a touch screen)(not shown) to the processor 120, the memory 130, the communication interface 160, or the connection module 170 through, for example, the bus 110. For example, the input/output interface 140 may provide, to the processor 120, data on a touch of a user input through a touch screen. Furthermore, the input/output interface 140 may output, through the input/output device (e.g., a speaker or a display), for example, the command or data received from the processor 120, the memory 130, the communication interface 160, or the connection module 170 through the bus 110. For example, the input/output interface 140 may output voice data processed by the processor 120 to a user through a speaker (not shown).

The display 150 may display various information (e.g., multimedia data or text data) to a user.

The communication interface 160 may establish communication between the electronic device 101 and an external device (e.g., the electronic device 104, an access point 106 or the server 164). For example, the communication interface 160 may be connected to a network 162 wirelessly or by wire so as to perform wireless/wired communicate with the external device. The wireless communication may include at least one of WiFi communication, BLUETOOTH (BT) communication, Near Field Communication (NFC), and cellular communication (e.g., Long Term Evolution (LTE), LTE-Advanced (LTE-A), Code Division Multiple Access (CDMA), Wideband-CDMA (WCDMA), Universal Mobile Telecommunications System (UMTS), Wireless Broadband (WiBro), or Global System for Mobile Communications (GSM)). The wired communication may include at least one of Universal Serial Bus (USB) communication, High Definition Multimedia Interface (HDMI) communication, Recommended Standard 232 (RS-232) communication, and Plain Old Telephone Service (POTS) communication.

According to an embodiment of the present disclosure, the network 162 may be a telecommunications network. The telecommunications network may include at least one of a computer network, the internet, the internet of things, and a telephone network. According to an embodiment of the present disclosure, a protocol (e.g., a transport layer protocol, a data link layer protocol, or a physical layer protocol)

for communication between the electronic device 101 and an external device may be supported by at least one of the application 134, the application programming interface 133, the middleware 132, the kernel 131 and the communication interface 160.

When the electronic device 101 is located within the coverage of, for example, the access point 106, the access point 106 may connected to the electronic device 101 so as to allow the electronic device 101 to access the network 162 outside the electronic device 101. Access points (e.g., 106 and 107) may be a mobile device (e.g., the first access point 106) or a non-mobile device (e.g., the second access point 107). According to an embodiment of the present disclosure, the locations of the access points 106 and 107 may be provided to the electronic device 101 through, for example, the server 164 (e.g., a Wireless Positioning System (WPS)) outside the electronic device 101.

The connection module 170 may process at least a part of information obtained from another element (e.g., the processor 120, the memory 130, the input/output interface 140 or the communication interface 160), and may provide the processed information to a user in various ways. For example, the connection module 170 may control at least a part of functions of the electronic device 101 independently or using the processor 120 so that the electronic device 101 is linked to another electronic device (e.g., the electronic device 104, the access points 106 and 107, or the server 164). According to an embodiment of the present disclosure, the connection module 170 may determine whether to connect the electronic device 101 to the access point 106 on the basis of whether the access point 106 located within a specific range from the electronic device is currently moved, in order to connect the electronic device 101 to the external network 164. The connection module 170 is further described below with reference to FIGS. 2 to 9.

Figure 2:
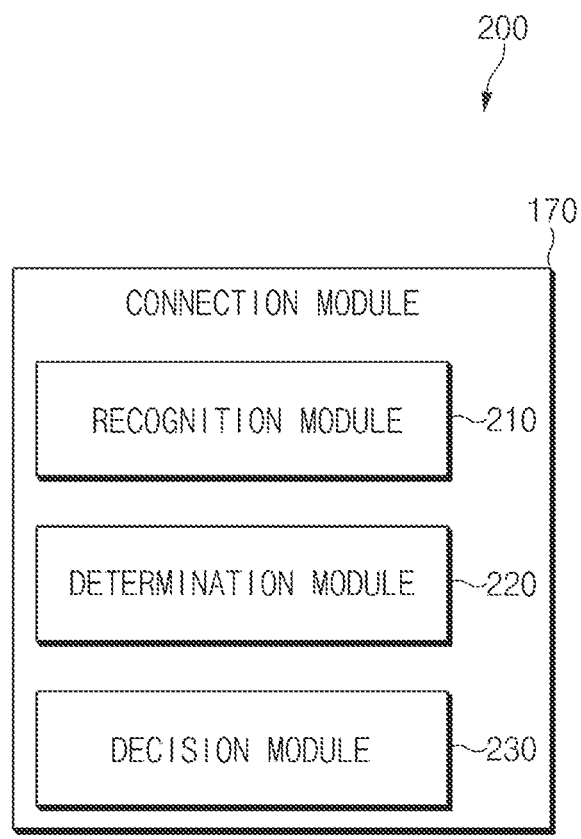
FIG. 2 is a schematic block diagram illustrating a connection module of the electronic device according to an embodiment of the present disclosure.

FIG. 2 schematically illustrates a connection module 200 of an electronic device (e.g., the electronic device 101) according to an embodiment of the present disclosure. The connection module 200 according to the present embodiment may be the connection module 170 of FIG. 1. Referring to FIG. 2, the connection module 200 may include a recognition module 210, a determination module 220, and a decision module 230.

The recognition module 210 may recognize an access point (e.g., the access point 106 or 107 of FIG. 1) located within a specific range, in which transmission/reception of signals (radio waves) is enabled, from an electronic device, in order to connect the electronic device to an external network. According to an embodiment, the recognition module 210 may receive, for example, a signal (e.g., a single sound signal, a beacon signal, or a frequency signal) so as to obtain information (e.g., a Media Access Control (MAC) address, a device number, or an AP name) on an access point that has transmitted the signal. The recognition module 210 may recognize the access point corresponding to the obtained information as a device located within a specific range from the electronic device.

According to an embodiment of the present disclosure, the recognition module 210 may obtain additional information related to at least one of recognized access points, such as location information, speed, acceleration or signal information, using at least one of a sensor module (e.g., 840 of FIG. 8) and a communication module (e.g., 820 of FIG. 8) functionally connected to the electronic device. According to an embodiment, the recognition module 210 may obtain additional information related to at least one of recognized access points from a server (e.g., 164 of FIG. 1) using the communication module (e.g., 820 of FIG. 8). For example, the additional information may include identification information (e.g., Subsystem Identification (SSID), device name and MAC address) related to at least one access point or location information. According to an embodiment, the recognition module 210 may obtain information of access points other than the recognized access point, on the basis of the additional information.

According to an embodiment, the recognition module 210 may recognize an access point (e.g., 106 of FIG. 1) included in a transport means (e.g., a bus or subway) or an access point (e.g., 107 of FIG. 1) fixed at a specific location.

The determination module 220 may determine a mobility state of the access point (e.g., 106 of FIG. 1) recognized by the recognition module 210 on the basis of the information obtained by the recognition module 210. According to an embodiment, the mobility state may indicate at least one of whether the access point is currently moved, whether the access point is a mobile access point and whether the location of the access point is relatively changed with respect to the electronic device.

According to various embodiments of the present disclosure, the determination module 220 may detect location information of an electronic device (e.g., 101 of FIG. 1) to determine whether the electronic device is located at a preset area. For example, the recognition module 210 may obtain the location information of the electronic device using at least one of a sensor module (e.g., 840 of FIG. 8) and a communication module (e.g., 820 of FIG. 8) functionally connected to the electronic device. Alternatively, the location information of the electronic device may be obtained from another element, for example, a server. When the location information of the electronic device is obtained and it is determined that the electronic device is located at a preset area, the determination module 220 may detect a mobility state (e.g., whether an access point is currently moved, whether the access point is a mobile access point or whether the location of the access point is relatively changed with respect to the electronic device) on the basis of information on locations of access points obtained from a server (e.g., 164 of FIG. 1), such as a list of non-mobile access points. For example, in the case where an access point (e.g., 106 of FIG. 1) recognized by the recognition module 210 is not included the list of non-mobile access points, the determination module 220 may determine that the recognized access point (e.g., 106 of FIG. 1) is currently moved.

According to various embodiments of the present disclosure, the determination module 220 may determine whether the electronic device (e.g., 101 of FIG. 1) is currently moved and/or may determine the type of a transport means (e.g., a bus or subway) of the electronic device if the electronic device is currently moved, on the basis of mobility information of the electronic device, such as speed or acceleration information. For example, the recognition module 210 or another element may measure the mobility information using a sensor (e.g., a motion sensor, an acceleration sensor, a proximity sensor or a GPS sensor) functionally connected to the electronic device. According to an embodiment of the present disclosure, for example, the determination module 220 may determine that the electronic device (e.g., 101 of FIG. 1) is in a transport means if the speed and/or acceleration is not less than a certain value. For example, the determination module 220 may determine the type of the transport means of the electronic device on the basis of a change pattern of the speed and/or acceleration.

According to various embodiments of the present disclosure, the determination module 220 may determine the mobility state of the access point (e.g., 106 of FIG. 1) on the basis of an amount of a change of a magnitude of a signal (e.g., a sound or frequency) of an access point among the information obtained through the recognition module 210.

According to various embodiments of the present disclosure, the determination module 220 may determine the mobility state of the access point (e.g., 106 of FIG. 1) on the basis of at least one of pieces of identification information (e.g., SSID information, beacon signal information, packet information, and channel information) on an access point obtained through the recognition module 210. For example, in the case where SSID information of the access point (e.g., 106 of FIG. 1) includes a text (e.g., "BUS" or "SUBWAY") indicating a transport means (e.g., a bus or subway) or includes a preset specific pattern (e.g., a name of a bus company or a terminology related to a specific transport means), the determination module 220 may determine that the access point is currently moved (by a specific transport means). For another example, in the case where a magnitude of a beacon signal of the access point (e.g., 106 of FIG. 1) is rapidly increased for a certain period of time, the determination module 220 may determine that the access point is currently moved. For another example, in the case where mobility information is detected by analyzing packet information of the access point (e.g., 106 of FIG. 1), the determination module 220 may determine that the access point is currently moved. For example, if the access point (e.g., 106 of FIG. 1) is a mobile access point, the mobility information may include a preset specific value indicating mobility set in a specific field of a packet. In the case where the specific value is included in the packet, the determination module 220 may determine that the access point is currently moved.

The decision module 230 may decide on whether to prevent or allow connection of an electronic device (e.g., 101 of FIG. 1) to an access point (e.g., 106 of FIG. 1). According to various embodiments, it may be determined whether to connect the electronic device (e.g., 101 of FIG. 1) and the access point (e.g., 106 of FIG. 1) according to a user input. For example, a user may manually set and determine whether to allow connection to a detected access point.

According to various embodiments of the present disclosure, the electronic device (e.g., 101 of FIG. 1) may control the connection between the electronic device and the access point (e.g., 106 of FIG. 1) on the basis of a result of the determination of the determination module 220. For example, even though the determination module 220 determines that the access point (e.g., 106 of FIG. 1) is currently moved, the electronic device may not be immediately connected to the access point so as to control the connection of the electronic device according to a state of the electronic device. For example, it may be additionally determined whether the electronic device is located in a transport means (e.g., a bus or subway), and, if it is determined that the electronic device is not located in a transport means, the electronic device may not be connected to the access point.

According to various embodiments of the present disclosure, the determination module 220 may determine whether the electronic device (e.g., 101 of FIG. 1) is located in a transport means (e.g., a bus or subway) on the basis of at least one of speed/acceleration information of the electronic device and information on payment of a fee of a transport means associated with a user of the electronic device.

According to various embodiments of the present disclosure, the determination module 220 may analyze a message received through a network, as the fee payment information of the transport means, so as to determine whether the fee of the transport means has been paid.

According to various embodiments of the present disclosure, the determination module 220 may use information stored in a payment module (e.g., an NFC module or Bluetooth module) functionally connected to an electronic device (e.g., 101 of FIG. 1) as the fee payment information of a transport means so as to determine whether the fee of the transport means has been paid.

According to various embodiments of the present disclosure, if it is determined that an electronic device (e.g., 101 of FIG. 1) is located in a transport means (e.g., a bus or subway), the decision module 230 may connect the electronic device to an access point installed in and moved together with the access point.

An electronic device according to various embodiments of the present disclosure may include: a module for recognizing an access point located within a specified range in which signals are transmittable/receivable from the electronic device, in order to connect the electronic device to an external network, a module for determining whether the access point is currently moved on the basis of information related to at least one of the access point and the external network, and a module for deciding whether to connect the electronic device to the access point on the basis of a result of the determining whether the access point is currently moved.

According to various embodiments of the present disclosure, the recognition module 210 may obtain recognition information of the access point connectable within a certain distance from the electronic device.

According to various embodiments of the present disclosure, the determination module 220 may determine whether the access point is moved on the basis of the recognition information of the access point.

According to various embodiments of the present disclosure, in the case where the recognized access point is not included in a list of one or more fixed access points among a plurality of access points located within the range, the determination module 220 may determine that the recognized access point is currently moved.

According to various embodiments of the present disclosure, the determination module 220 may measure a change of a distance between the access point and the electronic device so as to determine that the access point is currently moved if the change exceeds a specific reference value.

According to various embodiments of the present disclosure, the determination module 220 may receive information of a fixed access point from the outside on the basis of a location of the electronic device, and may determine whether the access point is moved on the basis of comparison with the information of the fixed access point.

According to various embodiments of the present disclosure, the control module may determine whether the electronic device is located in a transport means, and may connect the electronic device to an access point located in the transport means when the electronic device is located in the transport means.

According to various embodiments of the present disclosure, in the case where the access point is currently moved, the control module may control the connection to the access point according to selection by a user.

Figure 3:
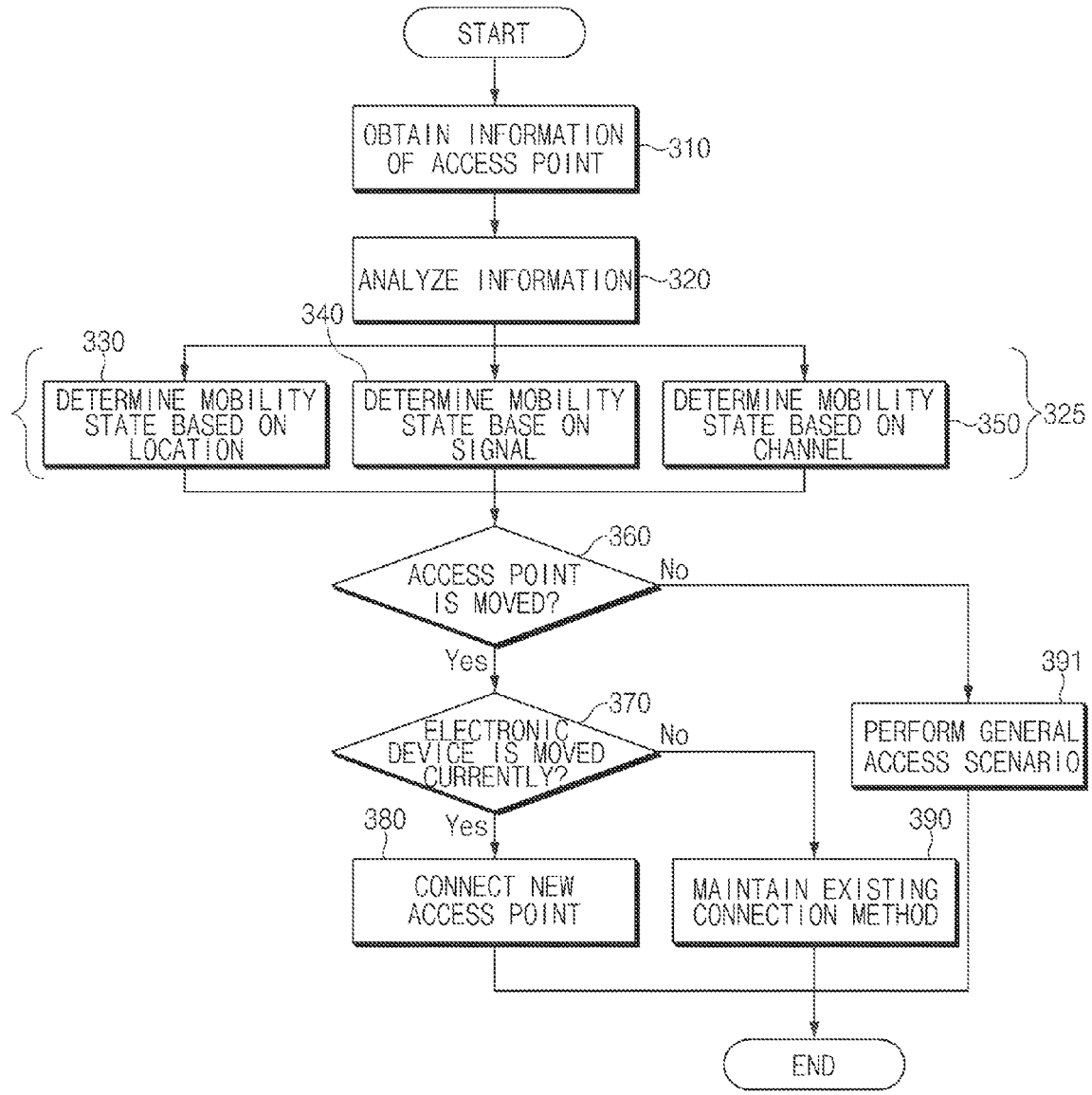
FIG. 3 is a flowchart illustrating a method of controlling a connection between the electronic device and an access point according to an embodiment of the present disclosure.

FIG. 3 is a flowchart illustrating a method of controlling connection between an electronic device (e.g., 101 of FIG. 1) and an access point (e.g., 106 of FIG. 1) according to an embodiment of the present disclosure.

In operation 310, the electronic device may obtain information of at least one of the electronic device, an access point (e.g., 106 of FIG. 1) and an external network.

In operation 320, the electronic device may analyze the type of the information of at least one of the electronic device, the access point and the external network, obtained in operation 310. The type of the information may be identified by analyzing the obtained information. According to the type of the information, a method of determining whether the access point is moved may be differentiated. For example, if the information obtained in operation 310 is determined as location information of the electronic device, it may be decided to determine a mobility state of the access point on the basis of the location information of the electronic device. For example, if the information obtained in operation 310 is determined as information on a signal change of the access point, it may be decided to determine the mobility state of the access point on the basis of the signal change of the electronic device. For example, if the information obtained in operation 310 is determined as information on a channel state of the access point, it may be decided to determine the mobility state of the access point on the basis of the channel state (e.g., a usage amount or change amount) of the electronic device.

In operation 325, the electronic device may determine the mobility state of the access point on the basis of at least one of the location information of the electronic device, the signal change of the access point and the channel state of the access point, according to a result of the analysis. The operations (e.g., operations 330, 340, and 350) included in operation 325 may be performed sequentially or simultaneously. Here, some operations may be omitted, or additional operations may be performed.

In operation 330, according to an embodiment of the present disclosure, the mobility state of the access point may be determined on the basis of the location information of the electronic device. A method of determining the mobility state on the basis of the location information will be further described with reference to FIG. 4.

In operation 340, according to an embodiment of the present disclosure, the electronic device may determine the mobility state of the access point (e.g., 106 of FIG. 1) on the basis of an amount of change (e.g., by using the Doppler effect) of a signal (e.g., a sound signal or frequency signal) of the access point (e.g., 106 of FIG. 1). A method of determining the mobility state of the access point (e.g., 106 of FIG. 1) on the basis of the signal change amount will be further described with reference to FIG. 5.

In operation 350, according to an embodiment of the present disclosure, the electronic device may determine the mobility state of the access point (e.g., 106 of FIG. 1) on the basis of the channel state information (e.g., a value of a channel usage or change amount) of the access point (e.g., 106 of FIG. 1). A method of determining the mobility state of the access point (e.g., 106 of FIG. 1) on the basis of the channel state will be further described with reference to FIGS. 6 and 7.

In operation 360, the electronic device may determine whether the access point (e.g., 106 of FIG. 1) is currently moved or is a mobile access point on the basis of a result of at least the determination (e.g., operations 330, 340, and 350) on the mobility sate of the access point. For example, if it is determined that the access point (e.g., 106 of FIG. 1) is currently moved, the connection between the electronic device and the access point may not be immediately established, and it may be further determined whether the electronic device is moved so as to determine whether to establish the connection.

According to an embodiment of the present disclosure, if it is determined that the access point (e.g., 106 of FIG. 1) is not currently moved, the electronic device may determine an access point to be connected to the electronic device according to a typical type of connection between the access point and the electronic device (e.g., 101 of FIG. 1). For example, an access point corresponding to a user input or an access point having highest signal strength (e.g., RSSI), from among recognized access points, may be determined as an access point to be connected to the electronic device. Alternatively, access points may be sorted in an order of signal strength, and attempts to connect to the access points may be made in the sorted order.

In operation 370, it is determined whether the electronic device (e.g., 101 of FIG. 1) is currently moved. For example, in the case where the speed or acceleration of the electronic device (e.g., 101 of FIG. 1) is not less than a prescribed reference value (e.g., 20 km per hour), it may be determined that the electronic device is located in a transport means or is moved with the transport means. The speed or acceleration of the electronic device (e.g., 101 of FIG. 1) may be measured using, e.g., a sensor module (e.g., 840 of FIG. 8).

According to various embodiments of the present disclosure, in the case of determining whether a user pays a transportation fee using a transportation card through an NFC module (e.g., 828 of FIG. 8), it may be determined whether the electronic device (e.g., 101 of FIG. 1) is located in and moved with a transport means (e.g., a bus or subway). For example, in the case where a fee is paid after the electronic device (e.g., 101 of FIG. 1) is located in the transport means (e.g., a bus or subway), the electronic device may obtain a payment-related message from a server or may receive approval-related information. When the message is obtained or the approval-related information is received, it may be determined that the electronic device has got on or got off the transport means.

According to various embodiments of the present disclosure, when data (e.g., a fee payment text message, or fee information) for determining whether a transportation fee has been paid is received through a communication module (e.g., 820 of FIG. 8) or an RF module (e.g., 829 of FIG. 8), it may be determined that the electronic device (e.g., 101 of FIG. 1) is located in and moved with the transport means (e.g., a bus or subway).

In operation 380, if it is determined that the electronic device (e.g., 101 of FIG. 1) is located in and moved with a transport means, the electronic device may be connected to an access point (e.g., 106 of FIG. 1) located in the transport means.

In operation 390, if the electronic device (e.g., 101 of FIG. 1) is not currently moved, the electronic device may be kept connected to a previously connected access point without being connected to the access point (e.g., 106 of FIG. 1).

In operation 391, if the access point (e.g., 106 of FIG. 1) is not currently moved, the electronic device may be connected to the access point or at least one of previously recognized access points according to a typical connection method.

FIGS. 4A to 4D are diagrams illustrating a method of determining mobility of an access point based on a location by an electronic device according to various embodiments of the present disclosure.

Figure 4A:
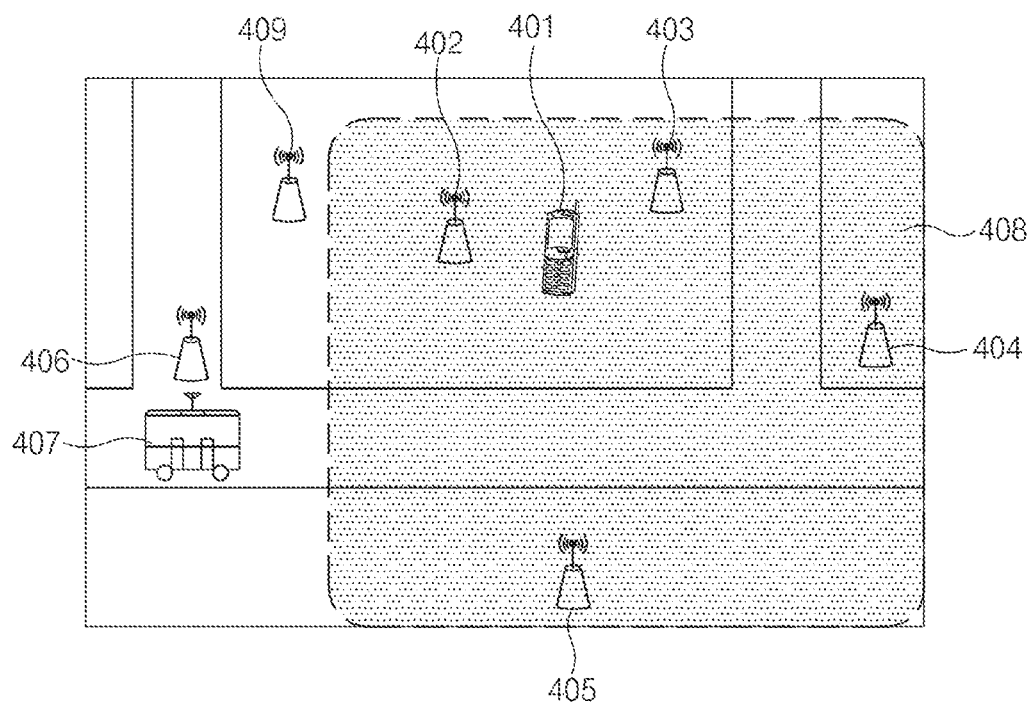
FIGS. 4A, 4B, 4C, and 4D are diagrams illustrating a method of determining, by the electronic device, mobility of the access point based on a location according to various embodiments of the present disclosure.

Referring to FIG. 4A, a plurality of connectable access points (e.g., 402 to 406 and 409) may be located around an electronic device 401. The electronic device 401 may be connected to at least one of the plurality of access points. The electronic device 401 may set a certain region including a connectable access point (e.g., a fixed access point 402, 403, 404, or 405 preinstalled in a region). The certain region may include a regional limit at which the access points (e.g., fixed access points 402 to 405 preinstalled in a region) connectable to the electronic device 401 are located.

According to various embodiments of the present disclosure, on the basis of a result of analyzing a user input (e.g., drag and drop, multi touch, or manual input of location information) and/or a movement pattern of a user, a certain region 408 may be automatically set. In the case of automatically setting the certain region, for example, when a user arrives at a bus stop via a frequently used path, a path on which the user repeatedly moves and a movement pattern is detected, so as to automatically set the certain region at a certain location (e.g., the periphery of a bus stop) of the user.

According to various embodiments of the present disclosure, when the electronic device 401 is located within the certain region 408, the electronic device 401 may request a server to provide information of access points (e.g., fixed access points 402 to 405) located within the certain region 408, on the basis of location information of the electronic device 401. In response to the request, the server may transfer, to the electronic device (e.g., 101 of FIG. 1), the information of the fixed access points (e.g., 402 to 405). When the access point 406 is newly recognized, the electronic device 401 may compare information of the newly recognized access point 406 with that of the fixed access points (e.g., 402 to 405). In the case where a location of the newly recognized access point 406 received from a server is not included in the information of the fixed access points, the newly recognized access point 406 may be recognized as, for example, an access point that is currently moved. When the access point 406 is determined as an access point that is currently moved, the electronic device 401 may keep connection to a previously connected access point or a previous connection method, without attempting to be connected to the access point 406. It may be determined whether to connect the electronic device 401 to the access point 406 according to whether the electronic device 401 is located in a transport means 407. For example, when the electronic device 401 is located in the transport means 407, the electronic device 401 may be connected to the access point 406.

Figure 4B:
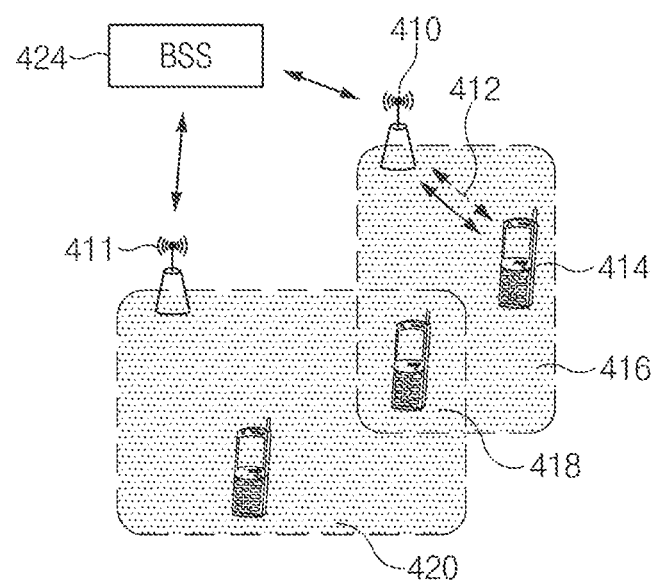

FIG. 4B illustrates an example of a situation in which connection to access points may be selected according to the location of the electronic device, according to various embodiments. A base station system (BSS) 424 may be connected to access points 410 and 411 so as to enable electronic devices respectively connected to the access points to communicate with an external network through the access points. The access points 410 and 411 may be connected to an electronic device 414 so as to allow the electronic device 414 to use the external network within certain regions 416 and 420 respectively. When the electronic device 414 is located in the first region 416, the electronic device 414 may receive a specific signal 412 (e.g., a beacon signal) from the access point 410. The electronic device 414 may obtain access point-related information from the signal, and may be connected to the first access point 410 using the obtained access point-related information. When the electronic device 414 is located in the second region 420, the electronic device 414 may receive a specific signal (not shown) from the second access point 411 so as to be connected to the access point 422 using information obtained from the received signal. When the electronic device 414 is located in a region 418 where the first region 416 and the second region 420 overlap with each other, the electronic device 414 receives specific signals from the access points 412 and 411, and may select one of the access points (e.g., the first access point 410 or the second access point 411) so as to be connected thereto.

Figure 4C:
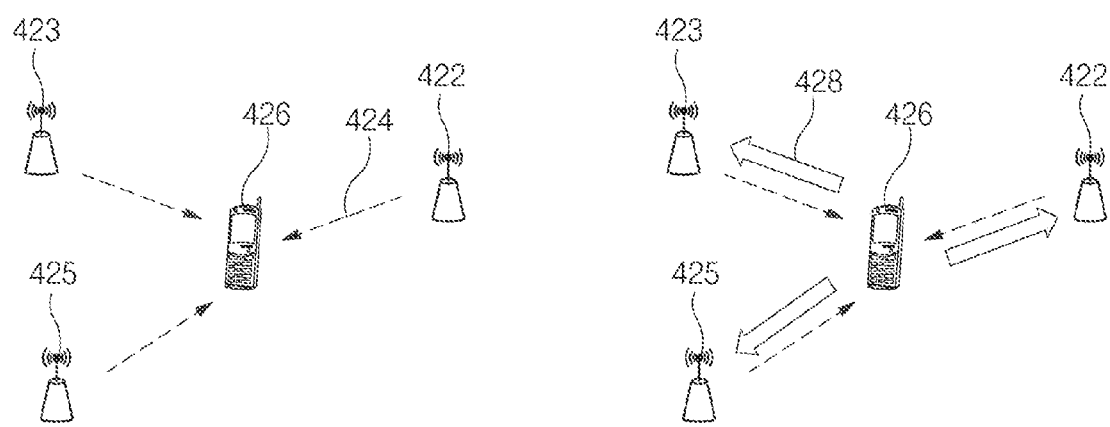

FIG. 4C illustrates a method of operating an access point 422 and an electronic device 426 so that the access point 422 and the electronic device 426 recognize each other. According to various embodiments of the present disclosure, in order to be connected to an access point (e.g., 422, 423, or 425), the electronic device 426 may recognize, on the basis of a signal (e.g., a signal 424 received from the first access point 422) received from any one of access points, another access point (e.g., the second access point 423 and the third access point 425) located within a certain region. Furthermore, according to various embodiments of the present disclosure, in order to check whether a connectable access point exists before the electronic device 426 receives a signal from any one of access points, the electronic device 426 may transmit signals 428 (e.g., broadcasting) to adjacent access points, may receive response signals related to an access point (e.g., 422, 423, or 425) connectable to the electronic device 426 within a certain region, and may recognize the connectable access point on the basis of the response signals.

Figure 4D:
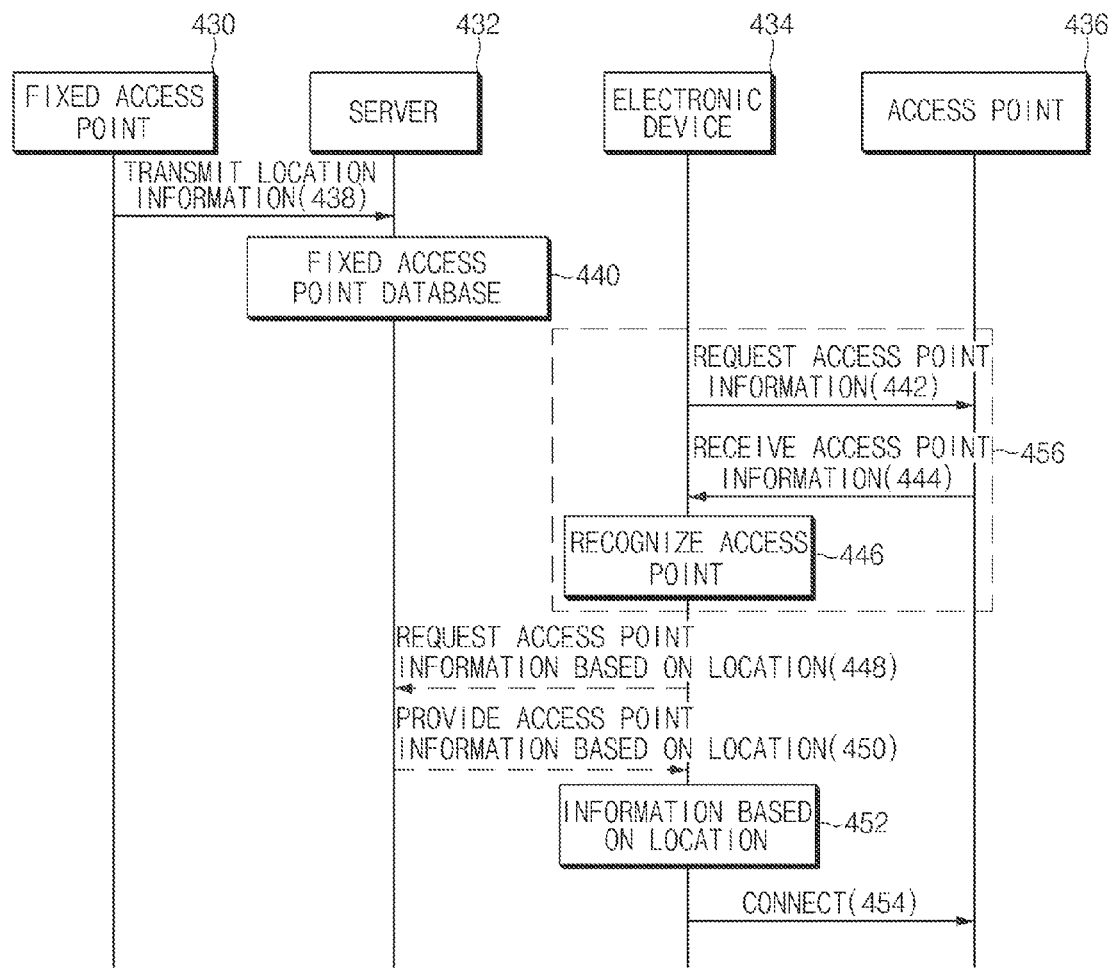

FIG. 4D illustrates a process of determining, by an electronic device, mobility of an access point.

Referring to FIG. 4D, a server 432 may detect information of a fixed access point 430. For example, the fixed access point 430 may be an access point installed in a certain region and is fixed so as not to be moved. According to an embodiment, the server 432 may receive location information from the fixed access point 430 in operation 438. The server 432 may generate or receive information related to the fixed access point 430 to store the information, and may construct a database 440 about information of the fixed access point in various ways. The server may share the information (e.g., GPS location information, SSID information and device name information) of the fixed access point 430 located within a certain region with another device (e.g., an electronic device 434). A process of recognizing an access point 436 by the electronic device 434 is referred to as a recognition process (e.g., scanning). For example, through recognition process 456, it may be determined whether an access point connectable to the electronic device exists. For example, as described above with reference to FIG. 4C, in recognition process 456, the electronic device 434 may request in operation 442 information of adjacent access points, or the specific access point 436 may transmit a signal thereof (e.g., periodic broadcasting of a beacon signal) to the electronic device 434.

In operation 444, the electronic device 434 may receive, from the access point 436, information (e.g., a speed, acceleration, SSID, beacon signal, signal magnitude or frequency magnitude of an access point) of the access point 436. In operation 446, the electronic device 434 may recognize the access point 436 on the basis of the information received in operation 444.

In operation 448, the electronic device 434 may send a request for information of a fixed access point to the server 432 on the basis of location information of the electronic device 434. In operation 450, the server 432 may extract, from the database, pieces of information of the fixed access point 430 related to the location information received from the electronic device 434, and may transfer the extracted information to the electronic device 434. In operation 452, the electronic device 434 may analyze a mobility state of the access point 436 by comparing the information of the fixed access point 430 received from the server 432 with the information of the access point 436 recognized through recognition process 456.

According to an embodiment of the present disclosure, in at least a portion of operation 452, the access point 436 may be determined as a fixed access point on the basis of the information on the fixed access point received from the server, and, in operation 454, the electronic device 434 may be connected to the access point 436. If the access point is not determined as a fixed access point, a new connection between the electronic device 434 and the access point 436 may not be established, and a connection between the electronic device 434 and another access point may be established. According to various embodiments of the present disclosure, the electronic device 434 may analyze a mobility state of an access point on the basis of not only location information but also a signal (e.g., a beacon signal, a signal received from an access point and a frequency received from the access point) received by the electronic device 434. For example, a change of a signal received from an access point may be measured so as to determine that the access point 436 is a moving access point if an amount of the change is not less than a certain reference value. Analysis on mobility of an access point may be performed on the basis of an amount of usage of a frequency channel for wireless communication. For example, if an amount of usage of a channel of a radio frequency of the access point 436 exceeds a certain reference value, an access point that newly uses the channel may be detected so as to determine that the new access point of the channel is a moving access point. The analysis on mobility of an access point will be further described below with reference to FIGS. 5A to 6D.

In connection operation 454, when the access point 436 is determined as a moving access point, it may be further determined whether the electronic device 434 is moved or whether the electronic device 434 is moved together with a transport means (e.g., a bus or subway). On the basis of a result of this determination, the electronic device 434 may be or may not be connected to the access point 436. For example, when the access point 436 is moved, it may be determined whether the electronic device is moved or whether the electronic device is moved together with a transport means, so as to connect the electronic device to an access point located in the transport means. In connection operation 454, in the case of a manual setting for selection by a user, the electronic device may be or may not be connected to the access point according to selection by the user.

Figure 5A:
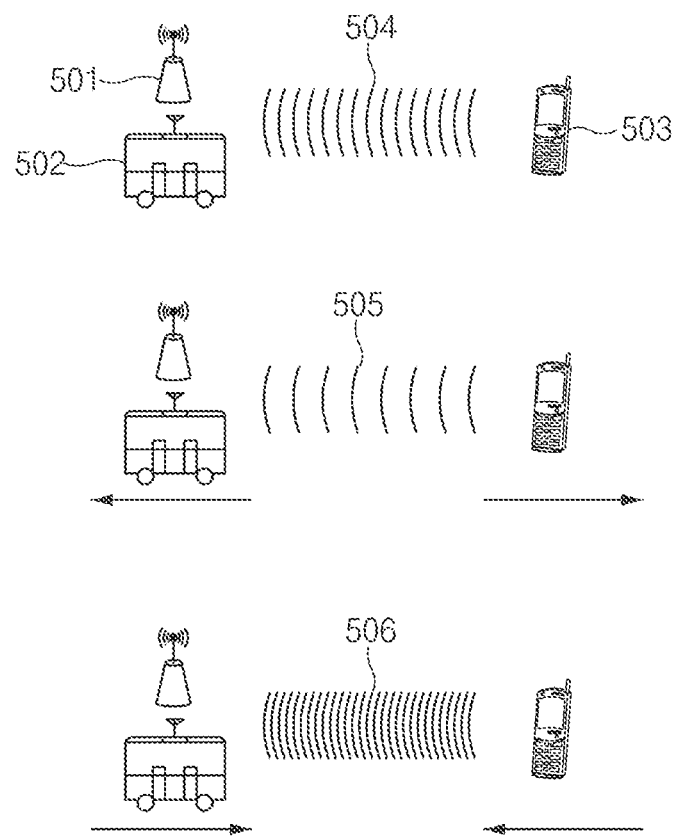
FIG. 5A illustrates a method of determining whether the access point is moved on the basis of a change of a signal according to an embodiment of the present disclosure.

FIG. 5A illustrates a method of determining whether an access point is moved on the basis of a change of a signal according to an embodiment of the present disclosure.

Referring to FIG. 5A, an amount of change of a signal (e.g., 504, 505, or 506) received from an access point 501 may be measured so as to determine whether the access point 501 is moved. For example, the signal change amount may be measured on the basis of the Doppler Effect. According to the Doppler Effect, an original frequency is distorted due to relative movement between a receiver and a transmitter. That is, when a distance between the transmitter and the receiver increases or decreases, a frequency of a signal increases or decreases. By using the Doppler Effect, amounts of changes of signals of an electronic device 503 and the access point 501 may be measured, and, on the basis of a result of the measurement, an amount of change of a relative distance between the electronic device 503 and the access point 501 may be measured. For example, when the relative distance between the electronic device 503 and the access point 501 is constant, a signal 504 having a constant magnitude may be detected. When the distance between the electronic device 503 and the access point 501 increases, a signal 505 having a relatively large magnitude may be detected. When the distance between the electronic device 503 and the access point 501 decreases, a signal 506 having a relatively small magnitude may be detected. For example, an amount of change of the signal may be measured on the basis of a velocity $V_s$ of the access point, a velocity $V_r$ of the electronic device, a velocity of a wave (in the case of a radio wave, the velocity of light (C): $3 \times 10^8$ m/s), and wavelength information ($\lambda_0$) of a radio wave emitted from a transmitting side, as expressed by Equation (1) below.

$$\Delta f = -\frac{v_{s,r}}{c} f_0 = -\frac{v_{s,r}}{\lambda_0} \qquad \text{Equation (1)}$$

where $v_{s,r} = v_s - v_r$

For example, the electronic device 503 may obtain a signal (e.g., a beacon signal or a sound signal) of the access point 501 and information (e.g., speed, acceleration or location information) of the electronic device 503. The electronic device 503 may detect a change of magnitude of the signal, and may determine whether the access point is moved.

According to various embodiments of the present disclosure, the electronic device 503 may determine that the access point 501 is moved, for example, if the magnitude of the signal is changed. When it is determined that the access point 501 is moved, the electronic device 503 may not be immediately connected to the access point 501 and may control connection of the electronic device to an external device according to an existing connection method (e.g., maintaining connection to currently connected other access points, or connecting to the access point or an access point having a highest signal strength from among the other access points).

According to various embodiments of the present disclosure, for example, the electronic device 503 may additionally determine whether the electronic device 503 is moved if there is no change in a magnitude of a signal between the access point 501 and the electronic device 503. According to an embodiment of the present disclosure, when it is determined that there is no change in a magnitude of a signal between the access point 501 and the electronic device 503 and the electronic device 503 is currently moved, the electronic device 503 may determine that the electronic device 503 and the access point 501 are currently moved together. For example, when it is determined that the access point 501 and the electronic device 503 are currently moved together, the electronic device 503 may estimate that the electronic device 503 is located in a transport means 502 in which the access point 501 is located, so as to connect the electronic device 503 to the access point 501.

Figure 5B:
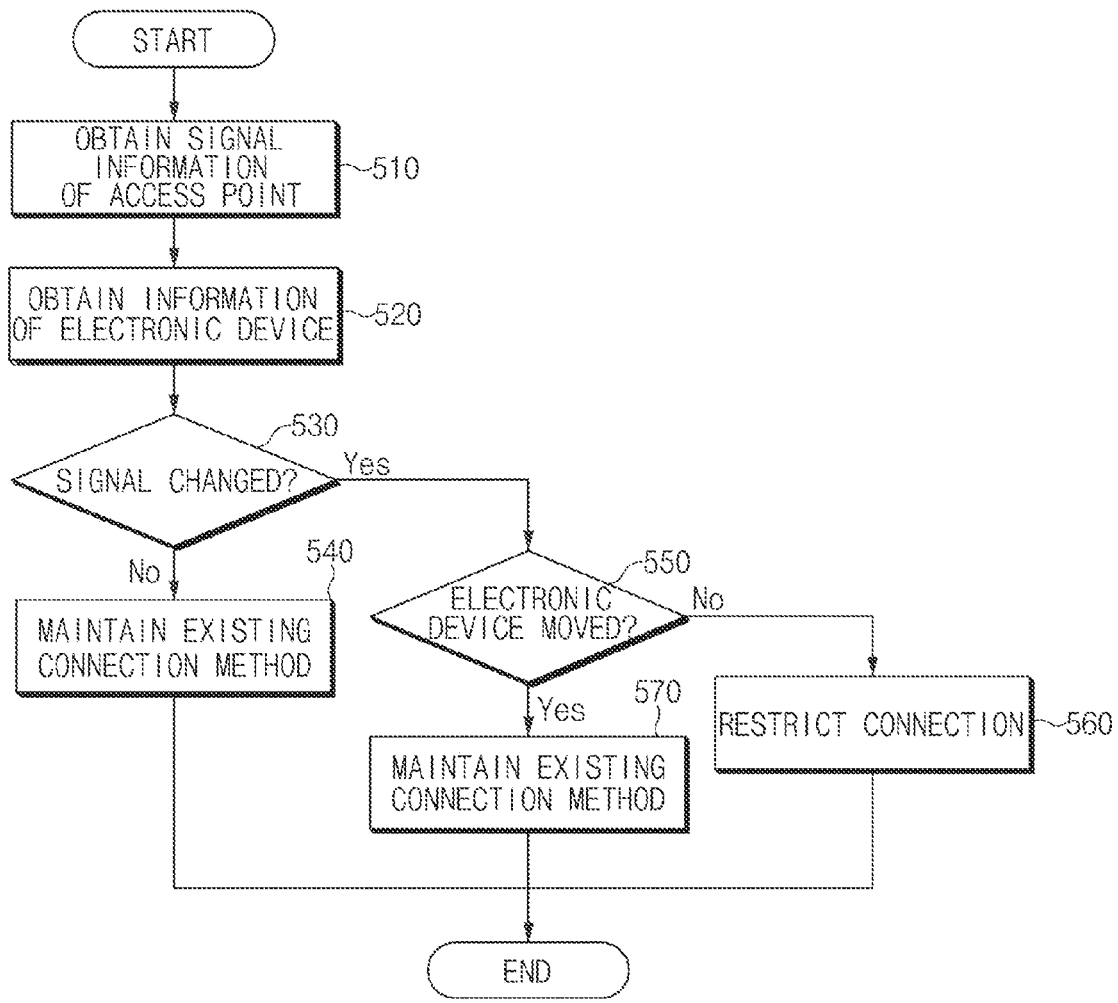
FIG. 5B is a flowchart illustrating a method of determining whether the access point is moved on the basis of a signal change amount according to an embodiment of the present disclosure.

FIG. 5B is a flowchart illustrating a method of determining whether an access point is moved on the basis of a signal change amount according to an embodiment of the present disclosure.

Referring to FIG. 5B, in operation 510, an electronic device (e.g., 503) may obtain signal information of an access point (e.g., 501). The signal information may include at least one of a frequency magnitude, a frequency change amount and speed information. In operation 520, the electronic device may obtain information of the electronic device, for example, through a sensor or a communication module functionally connected to the electronic device. The information of the electronic device may include a location (e.g., longitude and latitude information of the electronic device obtained through a GPS sensor) of the electronic device or a speed thereof.

In operation 530, it may be determined whether there is a change in a signal between the access point and the electronic device. For example, the signal change amount may be measured through certain computation (e.g., Equation (1)) on the basis of the information obtained in operations 510 and 520. According to an embodiment, when a distance between the electronic device and the access point increases, the signal change amount may be equal to or greater than a specified reference value. In this case, it may be determined that there is a change in the signal. According to an embodiment of the present disclosure, when the distance between the electronic device and the access point decreases, the signal change amount may be equal to or smaller than a specified reference value. In this case, it may be determined that there is a change in the signal. When there is a change in the signal, it may be determined that the distance between the electronic device and the access point is changed.

In operation 540, when the change in the signal between the electronic device and the access point satisfies the specified reference value, the electronic device may determine that there is no change in the signal, and may connection of the electronic device to an external device according to an existing connection method (e.g., maintaining connection to currently connected other access points, or connecting to the access point or an access point having a highest signal strength from among the other access points).

In operation 550, when it is determined that there is a change in the signal between the electronic device and the access point, the electronic device may additionally determine whether the electronic device is moved.

In operation 560, the electronic device may block the connection between the electronic device and the access point or may attempt to be connected to another access point, if it is determined that the electronic device is not moved in operation 550.

In operation 570, the electronic device may establish a connection between the electronic device and the access point, if it is determined that the electronic device is moved in operation 550. For example, when the access point is moved and the electronic device is moved, it may be determined that the electronic device is located in a transport means (e.g., a bus or subway) in which the access point is installed.

Figure 6A:
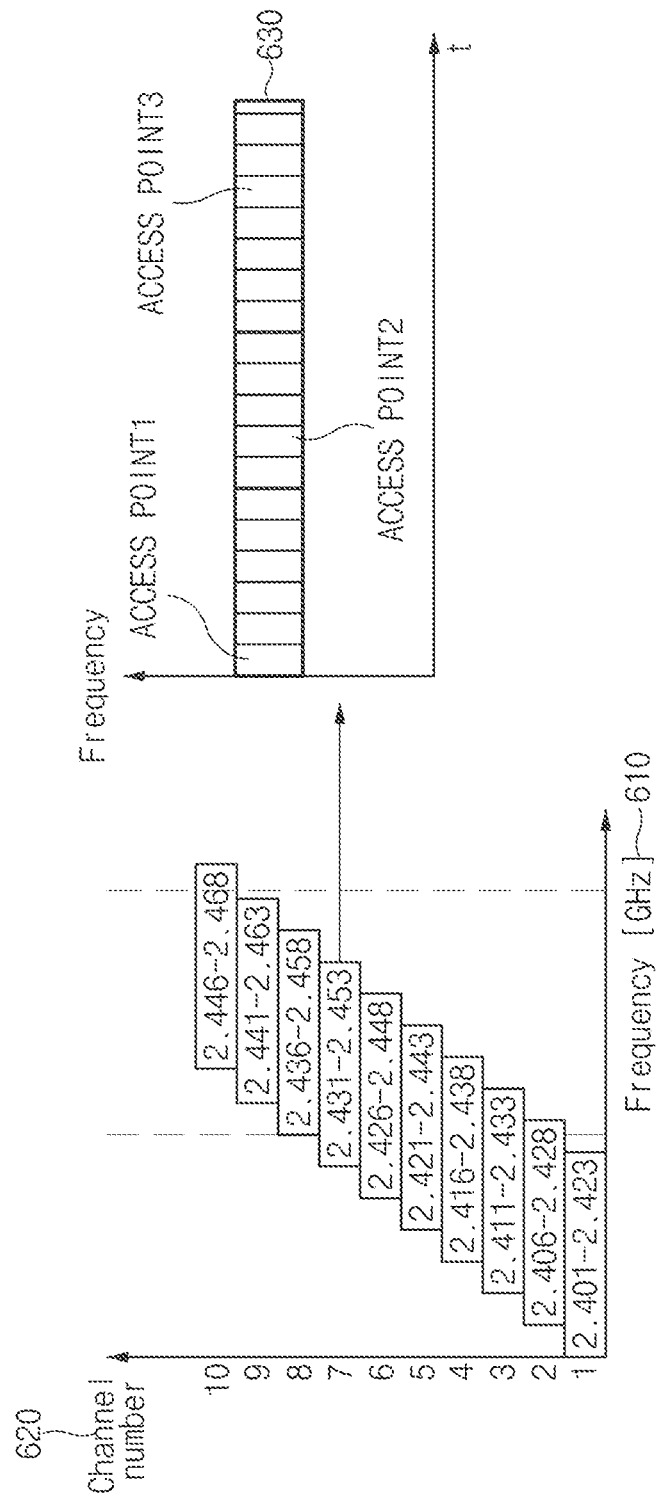
FIGS. 6A, 6B, and 6C illustrate methods of analyzing the mobility of the access point on the basis of network usage amount information of the electronic device according to various embodiments of the present disclosure.
Figure 6B:
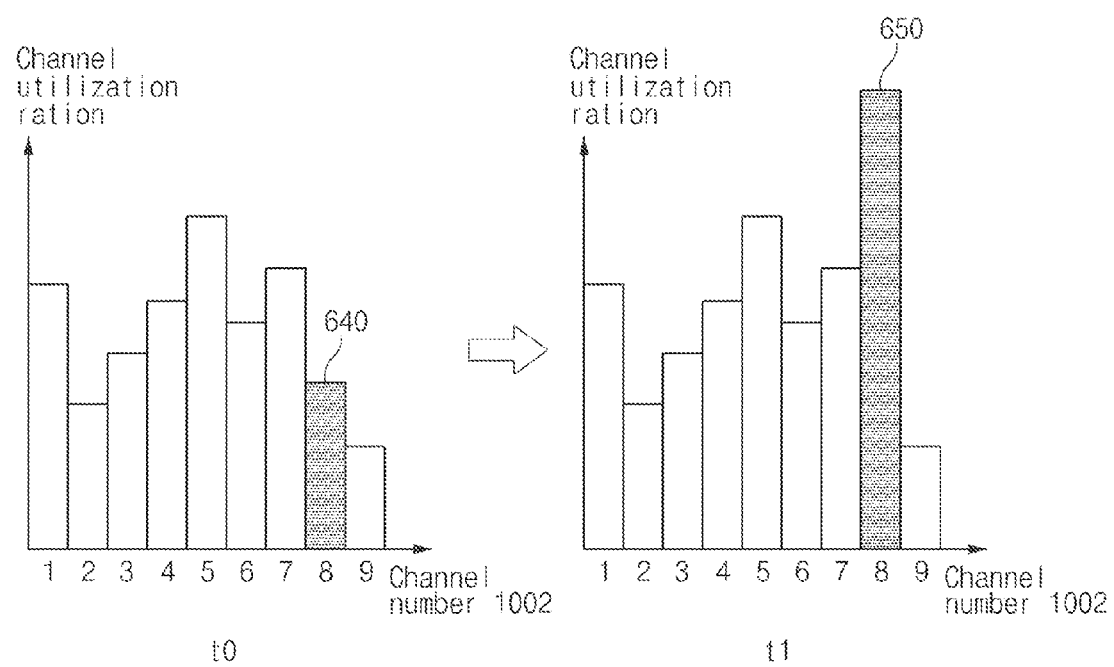
Figure 6C:
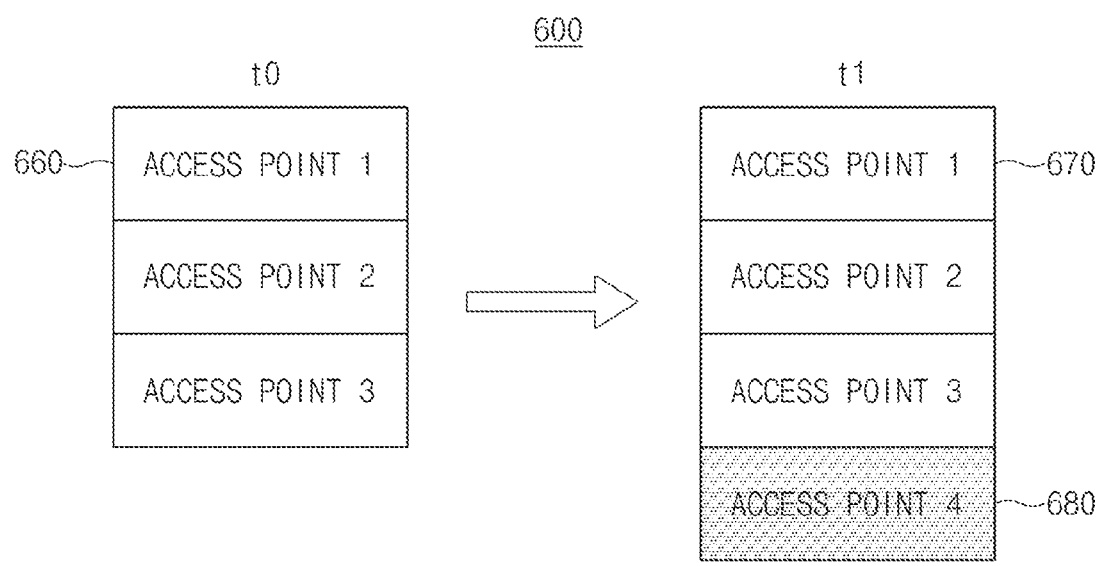

FIGS. 6A to 6C illustrate methods of analyzing mobility of an access point on the basis of network usage amount information (e.g., channel utilization ration) of the electronic device according to various embodiments of the present disclosure.

According to various embodiments, a radio frequency of a network may be divided for a plurality of channels so as to be used. By analyzing usage amount information of a plurality of access points which use the radio frequency of the network for each channel, mobility of the access points may be determined. Referring to FIG. 6A, an electronic device (e.g., 101 of FIG. 1) may divide a radio frequency (e.g. a frequency 610) into a plurality of channels in order to be connected to an access point located within a range in which a signal (radio wave) is transmittable/receivable from the electronic device. An identifier (e.g., a channel number 620) may be allocated to each channel.

Referring to FIG. 6B, an amount of usage of a channel allocated to each frequency may be measured. For example, the channel usage amount may be measured at a time t0 and a time t1, and the measured channel usage amounts may be compared with each other, so as to determine whether an amount of usage of a specific channel has been increased. For example, in the case where an amount of usage of channel number 8 is measured as 640 at the time t0, and the channel usage amount of channel number 8 is measured as 650 at the time t1 after elapse of a certain time from the time t0, it may be determined that the amount of usage of the channel by access points has been increased. A plurality of access points may time-divide (time-based division) a channel so as to use the channel.

Referring to FIG. 6C, a plurality of access points which use a channel 650 may be compared with each other. For example, a list of a plurality of access points related to a channel (e.g., 640 of FIG. 6B) of which a usage amount has been increased may be detected. For example, a search for access points which use respective channels may be performed at the time t0 so as to generate a first list 660 of found access points, and the search for access points which use the channels may be re-performed at the time t1 so as to generate a second list 670 of found access points. It may be determined whether an access point has been newly added during a certain period of time by comparing the first and second lists 660 and 670 with each other. The electronic device may detect information of the newly added access point 680 (e.g., information of electronic devices connected to the access point 680). For example, the electronic device may determine that the newly added access point 680 is a currently moving access point, so as to restrict connection between the electronic device and the newly added access point 680.

Figure 6D:
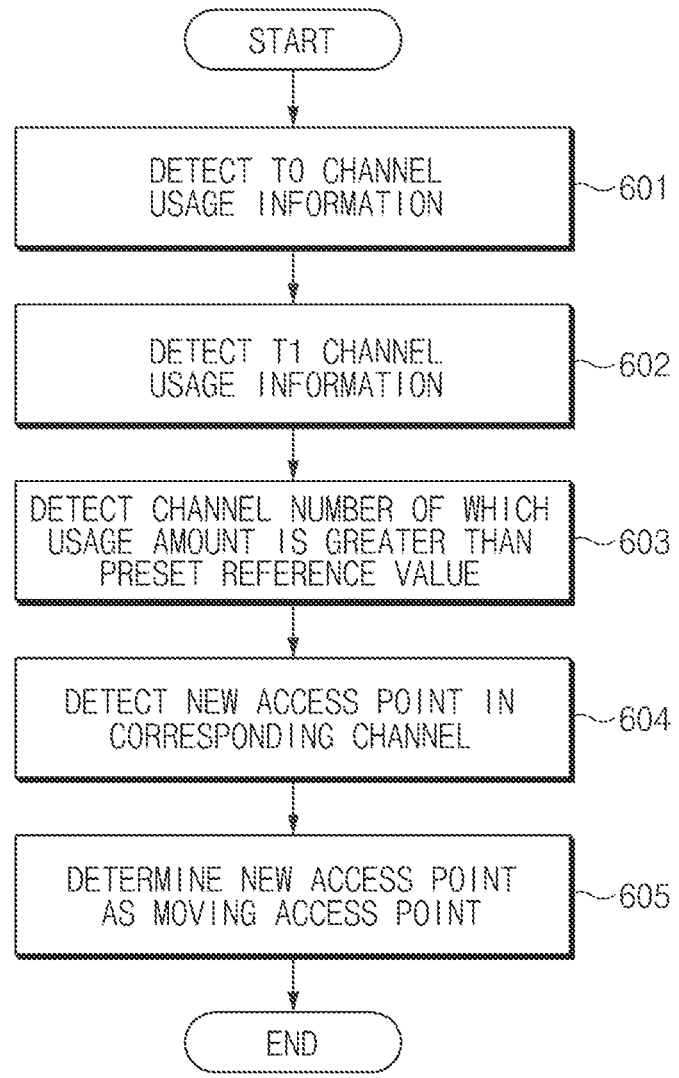
FIG. 6D is a flowchart illustrating a method of determining whether the access point is moved on the basis of usage information of a radio frequency according to an embodiment of the present disclosure.

FIG. 6D is a flowchart illustrating a method of determining whether an access point is moved on the basis of usage information of a radio frequency, according to an embodiment of the present disclosure.

In operation 601, the electronic device may check a usage amount of each channel allocated to a radio frequency, at a time t0.

In operation 602, at a time t1 after elapse of a certain period of time from the time t0, the electronic device may re-check the usage amount of each channel.

In operation 603, the electronic device may compare the usage amounts of the channels with each other, and, if a usage amount of a specific channel has increased above a threshold, the electronic device may obtain information of the channel.

In operation 604, a new access point in the channel may be detected. For example, a first list of access points which use the channel at the time t0 and a second list of access points which use the channel at the time t1 may be compared with each other, so as to determine an access point which is not included in the first list but is included in the second list as a newly added access point.

In operation 605, the electronic device may estimate that the newly added access point has mobility.

According to an embodiment of the present disclosure, the electronic device (e.g., 101 of FIG. 1) may obtain information on a channel of a radio frequency used by the access point (e.g., 106 of FIG. 1) at the time t0 and the time t1. For example, at least one of a device name, SSID and channel usage amount of the access point that is currently used in the channel may be detected from the information.

According to an embodiment of the present disclosure, an access point newly added to the channel may be detected by comparing radio frequency channel information (e.g., a device name or SSID of an access point related to the channel) of the time t0 and t1. According to another embodiment of the present disclosure, an access point newly added to the channel may be detected by comparing channel usage amounts of the time t0 and time t1 and detecting information of an access point of a channel of which a usage amount has been rapidly increased. According to an embodiment of the present disclosure, the newly added access point may be determined as a currently moving access point, so as to restrict connection between the electronic device and the newly added access point.

Figure 7A:
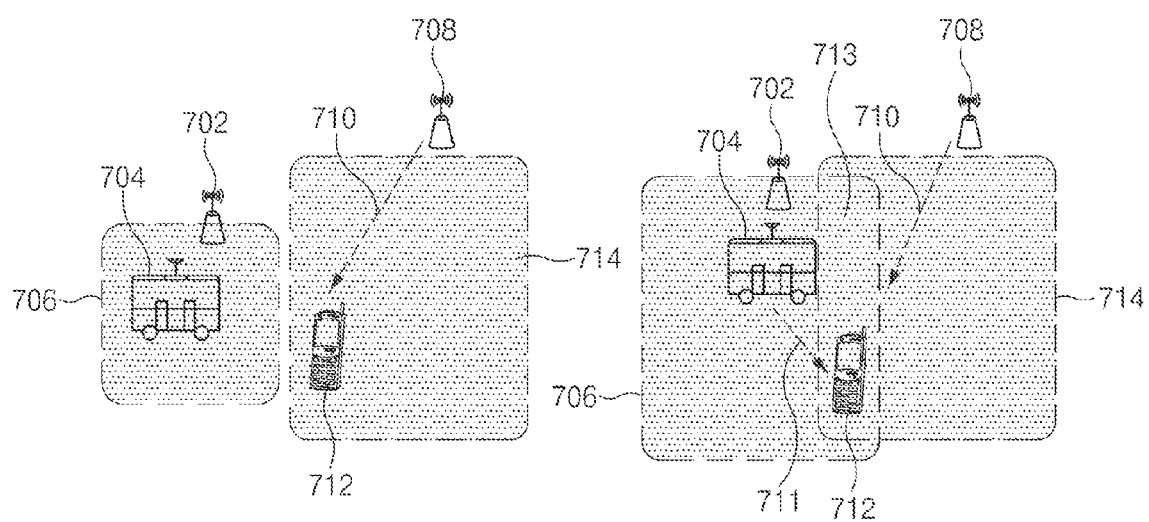
FIGS. 7A, 7B, and 7C illustrate methods of connecting the electronic device to the access point according to a change of a relative distance between the electronic device and the access point, according to various embodiments.
Figure 7B:
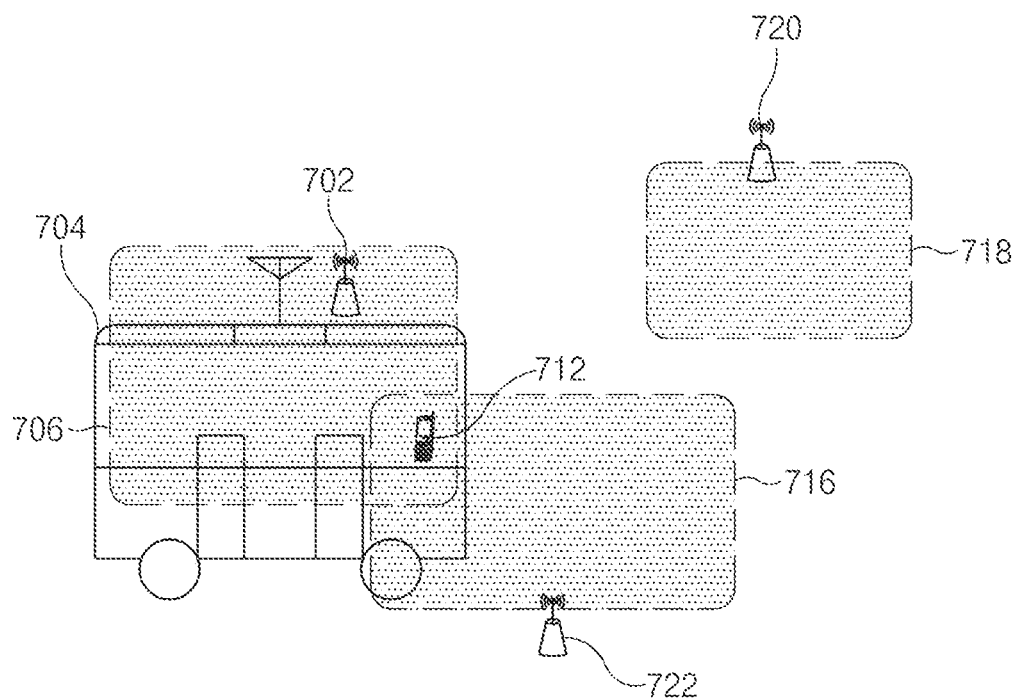
Figure 7C:
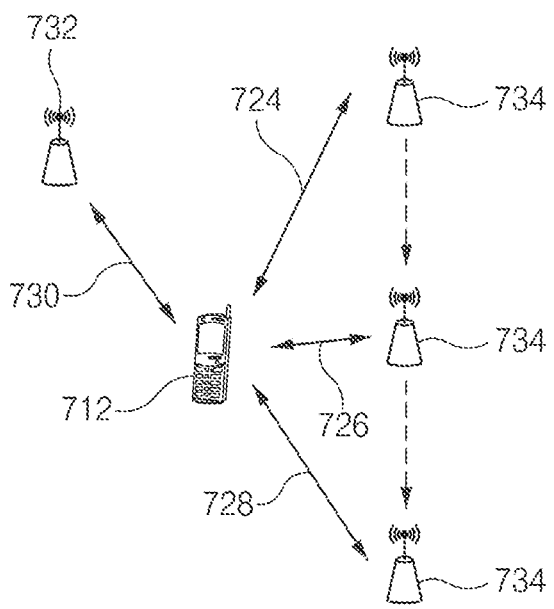

FIGS. 7A to 7C illustrate methods of connecting an electronic device to an access point according to a change of a relative distance between the electronic device and the access point according to various embodiments of the present disclosure.

According to various embodiments of the present disclosure, if the relative distance between the electronic device and the access point is changed even though the electronic device is not moved, it may be determined that the access point is moved, and the connection between the electronic device and the access point may be restricted. The change of the relative distance between the access point and the electronic device may be determined using similar methods or the same methods as the above-mentioned methods (e.g. the methods of FIGS. 4A to 4D, 5A to 5B, and 6A to 6D) of determining whether the access point is moved or on the basis of a result of the above-mentioned determining whether the access point is moved. According to an embodiment of the present disclosure, when a magnitude of a signal received by the electronic signal from the access point is changed, it may be determined that the relative distance between the electronic device and the access point is changed. According to an embodiment of the present disclosure, when it is determined that the access point recognized by the electronic device is moved, it may be determined that the relative distance between the electronic device and the access point is changed. According to an embodiment of the present disclosure, when the electronic device is currently moved but the relative distance between the electronic device and the access point is not changed, it may be determined that the electronic device and the access point are moved together. In this case, even though another access point is detected by the electronic device, the electronic device may not be connected to the other access point, and the connection between the electronic device and the access point which are currently moved together may be maintained. When the electronic device is currently moved and the relative distance between the electronic device and the access point is changed, it may be determined that the access point is not moved together with the electronic device, and the connection between the electronic device and the access point may be restricted.

FIG. 7A illustrates a method of connecting an electronic device 712 to an access point when the electronic device 712 is not moved. For example, when the electronic device 712 is located within a connectable range 714 of a second access point 708, the electronic device 712 may receive a signal 710 (e.g., a beacon signal) of the second access point 708, and the electronic device 712 may be connected to the second access point 708 in response to the received signal 710. Here, if a first access point 702 that supports a connectable range 706 is located in and moved together with a transport means 704 (e.g., a bus), the electronic device 712 may be located in a region 713 where a signal 711 (e.g., a beacon signal) of the first access point 702 is received. When the electronic device 712 is located in the region 713 where both the signal 710 of the second access point 708 and the signal 711 of the first access point 702 are received, the electronic device 712, for example, may be connected to one of the access points (the second access point 708 or the first access point 702). According to an embodiment, the electronic device 712 may determine a relative distance between the electronic device 712 and the first access point 702, and may restrict the connection between the first access point 702 and the electronic device 712 if the electronic device 712 is not moved but the relative distance is changed.

FIG. 7B illustrates a method of connecting the electronic device 712 to the access point when the electronic device 712 is moved. For example, when the electronic device 712 is moved together with the transport means 704 (e.g., a bus), the electronic device 712 may be connected to the first access point 702 located in the transport means 704 within the connectable range 706. Due to movement of the transport means 704, the electronic device 712 may be located within a connectable range (e.g., 718 or 716) of another access point (e.g., 720 or 722). For example, the electronic device 712 may be included in the connectable range 716 of the third access point 722. Here, when it is determined that the electronic device 712 is currently moved and a change of a distance to the first access point 702 falls into a preset range, the electronic device 712 may restrict connection between the electronic device 712 and the third access point 722 or maintain the connection between the electronic device 712 and the first access point.

FIG. 7C illustrates a method of determining whether to connect the electronic device 712 to an access point 732 on the basis of a relative distance 730 therebetween. According to various embodiments of the present disclosure, when a relative distance 730 between the electronic device 712 and the access point 732 is constant, the electronic device 712 may be connected to the access point 732. According to various embodiments of the present disclosure, when an access point 734 is currently moved, a relative distance (e.g., 724, 726 or 728) between the access point 734 and the electronic device 712 may vary with movement of the access point 734. Here, the electronic device 712 may restrict connection between the electronic device 712 and the access point 734.

According to various embodiments of the present disclosure, an electronic device control method may include: an operation for recognizing an access point located within a specified range in which signals are transmittable/receivable from the electronic device, in order to connect the electronic device to an external network, an operation for determining whether the access point is currently moved on the basis of information related to at least one of the access point and the external network, and an operation for deciding whether to connect the electronic device to the access point on the basis of a result of the determining whether the access point is currently moved.

According to various embodiments of the present disclosure, the operation for determining may include: an operation for checking whether the recognized access point is included in a list of one or more fixed access points among a plurality of access points located within the range, and an operation for determining that the recognized access point is currently moved if the recognized access point is not included in the list.

According to various embodiments of the present disclosure, the operation for checking may include an operation for obtaining the list from an external server or a storage medium functionally connected to the electronic device, on the basis of the location of the electronic device.

According to various embodiments of the present disclosure, the operation for determining may include: an operation for measuring a change of a distance between the access point and the electronic device, and an operation for determining that the access point is currently moved if the distance change exceeds a specific reference value.

According to various embodiments of the present disclosure, the operation for measuring may include an operation for measuring the change on the basis of strength of a signal received from the access point.

According to various embodiments of the present disclosure, the operation for determining may include: an operation for measuring an amount of network usage of the access point, and an operation for determining that the access point is currently moved if the network usage amount increases.

According to various embodiments of the present disclosure, the operation for determining may include: an operation for checking whether the access point uses a frequency channel of which a usage amount has been increased among a plurality of frequency channels allocated to the external network, and an operation for determining that the access point is currently moved if the access point uses the frequency channel.

According to various embodiments of the present disclosure, the operation for deciding may include: an operation for determining whether the electronic device is located within a transport means if the access point is currently moved, and an operation for allowing the connection if the electronic device is located within the transport means.

According to various embodiments of the present disclosure, the operation for determining whether the access point is located within the transport means may include a method based on a result of determining whether a moving speed of the access point exceeds a specific reference value.

According to various embodiments of the present disclosure, the operation for determining whether the electronic device is located within the transport means may be based on at least one of a moving speed of the electronic device and fee payment information of the electronic device.

According to various embodiments of the present disclosure, the fee payment information may be received from an external server or may be obtained from a storage medium functionally connected to the electronic device.

Figure 8:
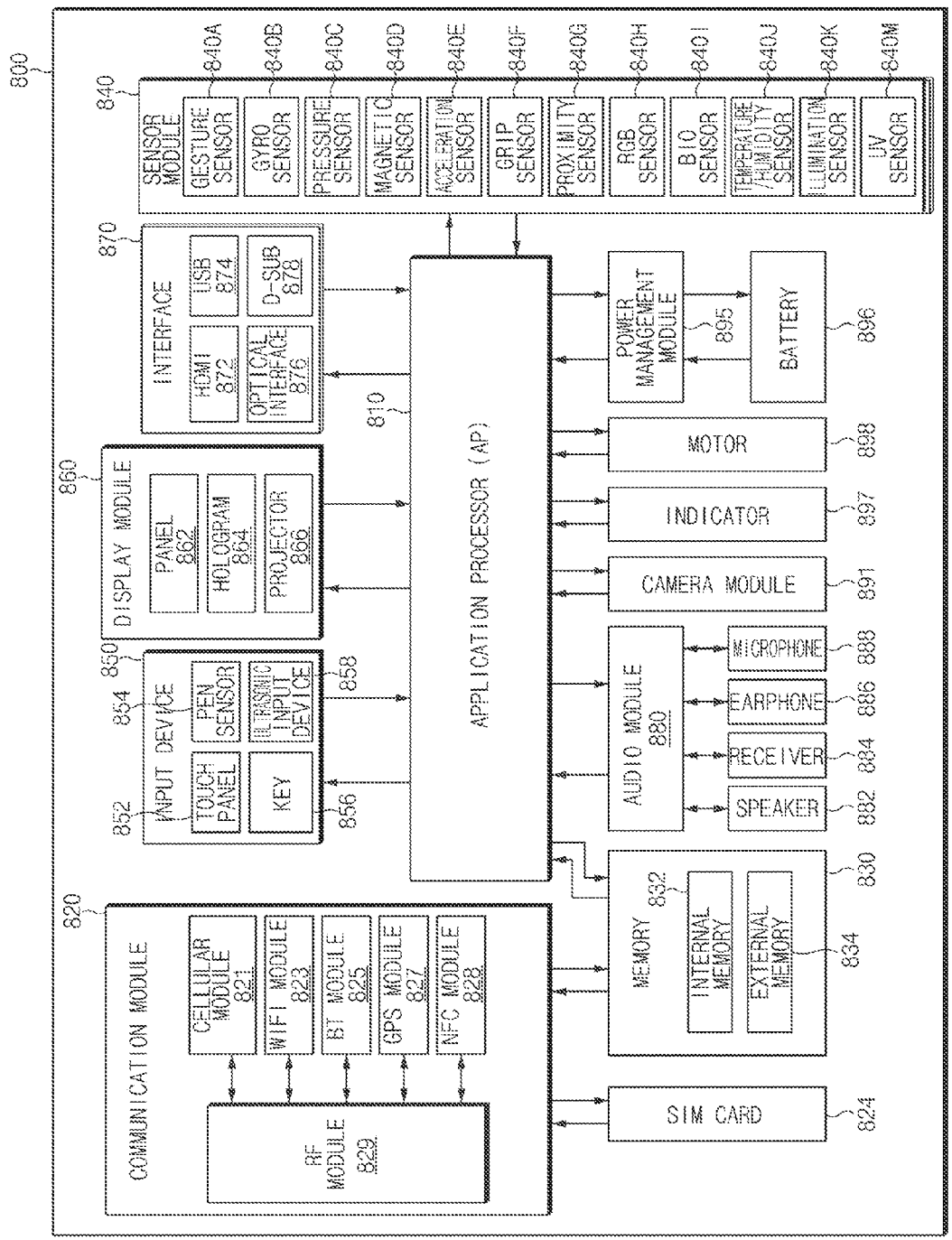
FIG. 8 is a schematic block diagram illustrating hardware according to an embodiment of the present disclosure.

FIG. 8 is a block diagram illustrating an electronic device 800 according to an embodiment of the present disclosure. The electronic device 800 may constitute, for example, a part or the entirety of the electronic device 101 illustrated in FIG. 1.

Referring to FIG. 8, the electronic device 800 may include at least one application processor (AP) 810, a communication module 820, a Subscriber Identification Module (SIM) card 824, a memory 830, a sensor module 840, an input device 850, a display module 860, an interface 870, an audio module 880, a camera module 891, a power management module 895, a battery 896, an indicator 897 and a motor 898.

The AP 810 may run an operating system or an application program so as to control a plurality of hardware components connected to the AP 810 or software components, and may process various data including multimedia data and may perform an operation. The AP 810 may be implemented with, for example, a System on Chip (SoC). According to an embodiment, the AP 810 may further include a Graphic Processing Unit (GPU, not illustrated).

The communication module 820 (e.g., the communication interface 160) may perform data transmission/reception for communication between the electronic device 801 (e.g., the electronic device 101) and another electronic device (e.g., the electronic device 104, the access point 106 or the server 164) connected thereto through a network. According to an embodiment, the communication module 820 may include a cellular module 821, a WiFi module 823, a BT module 825, a GPS module 827, an NFC module 828, and a Radio Frequency (RF) module 829.

The cellular module 821 may provide a voice call service, a video call service, a text message service, or an Internet service through a telecommunications network (e.g., LTE, LTE-A, CDMA, WCDMA, UMTS, WiBro or GSM network). Furthermore, the cellular module 821 may identify and authenticate electronic devices in the telecommunications network using, for example, a subscriber identification module (e.g., the SIM card 824). According to an embodiment, the cellular module 821 may perform at least a part of functions provided by the AP 810. For example, the cellular module 821 may perform at least a part of a multimedia control function.

According to an embodiment, the cellular module 821 may include a Communication Processor (CP)(not shown). The cellular module 821 may be implemented with, for example, a SoC. Although FIG. 8 illustrates that the cellular module 821 (e.g., a communication processor), the memory 830 and the power management module 895 are separate from the AP 810, the AP 810 may include at least a part of the foregoing elements (e.g., the cellular module 821), according to an embodiment.

According to an embodiment of the present disclosure, the AP 810 or the cellular module 821 (e.g., a communication processor) may load, on a volatile memory, a command or data received from at least one of a nonvolatile memory and other elements connected to the AP 810 or the cellular module 821, so as to process the command or data. Furthermore, the AP 810 or cellular module 821 may store, in the nonvolatile memory, data received from or generated by at least one of the other elements. Each of the WiFi module 823, the BT module 825, the GPS module 827 and the NFC module 828 may include, for example, a processor for processing data transmitted/received through the modules. FIG. 8 illustrates the cellular module 821, the WiFi module 823, the BT module 825, the GPS module 827 and the NFC module 828 as if the modules are separate blocks. However, according to an embodiment, at least a part (e.g., two or more) of the cellular module 821, the WiFi module 823, the BT module 825, the GPS module 827 and the NFC module 828 may be included in a single Integrated Chip (IC) or IC package. For example, at least a part (e.g., a communication processor corresponding to the cellular module 821 and a WiFi processor corresponding to the WiFi module 823) of the cellular module 821, the WiFi module 823, the BT module 825, the GPS module 827 and the NFC module 828 may be implemented with a single SoC.

The RF module 829 may transmit/receive data, for example, may transmit/receive an RF signal. Although not illustrated, for example, a transceiver, a Power Amp Module (PAM), a frequency filter or a Low Noise Amplifier (LNA) may be included in the RF module 829. Furthermore, the RF module 829 may further include a component such as a conductor or a wire for transmitting/receiving free-space electromagnetic waves in a wireless communication system. FIG. 8 illustrates the cellular module 821, the WiFi module 823, the BT module 825, the GPS module 827 and the NFC module 828 as if the modules share the single RF module

829. However, according to an embodiment, at least one of the cellular module 821, the WiFi module 823, the BT module 825, the GPS module 827 and the NFC module 828 may transmit/receive RF signals through an additional RF module.

The SIM card 824 may include a subscriber identification module, and may be inserted into a slot formed at a specific location of the electronic device. The SIM card 824 may include unique identification information (e.g., an Integrated Circuit Card Identifier (ICCID)) or subscriber information (e.g., International Mobile Subscriber Identity (IMSI)).

The memory 830 (e.g., the memory 130) may include an internal memory 832 or an external memory 834. The internal memory 832 may include at least one of a volatile memory (e.g., a Dynamic Random Access Memory (DRAM), a Static RAM (SRAM) or a Synchronous Dynamic RAM (SDRAM)) and a nonvolatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, or a NOR flash memory).

According to an embodiment, the internal memory 832 may be a Solid State Drive (SSD). The external memory 834 may include a flash drive, for example, Compact Flash (CF), Secure Digital (SD), Micro Secure Digital (Micro-SD), Mini Secure Digital (Mini-SD), extreme Digital (xD) or a memory stick. The external memory 834 may be functionally connected to the electronic device 801 through various interfaces. According to an embodiment, the electronic device 801 may further include a storage device (or a storage medium) such as a hard drive.

The sensor module 840 may measure physical quantity or detect an operation sate of the electronic device 801 so as to convert measured or detected information into an electrical signal. The sensor module 840 may include, for example, at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a red/green/blue (RGB) sensor), a biometric sensor 840I, a temperature/humidity sensor 840J, an illumination sensor 840K, and an Ultraviolet (UV) sensor 840M. Additionally or alternatively, the sensor module 840 may include, for example, (not shown) an olfactory sensor (E-nose sensor), an Electromyography (EMG) sensor, an Electroencephalogram (EEG) sensor, an Electrocardiogram (ECG) sensor, an Infrared (IR) sensor, an iris recognition sensor, or a fingerprint sensor. The sensor module 840 may further include a control circuit for controlling at least one sensor included therein.

The input device 850 may include a touch panel 852, a (digital) pen sensor 854, a key 856, or an ultrasonic input device 858. The touch panel 852 may recognize a touch input using at least one of capacitive, resistive, infrared, and ultraviolet sensing methods. The touch panel 852 may further include a control circuit. In the case of using the capacitive sensing method, a physical contact recognition or proximity recognition is allowed. The touch panel 852 may further include a tactile layer. In this case, the touch panel 852 may provide tactile reaction to a user.

The (digital) pen sensor 854 may be implemented, for example, in a similar or same manner as the method of receiving a touch input of a user or may be implemented using an additional sheet for recognition. The key 856 may include, for example, a physical button, an optical button, or a keypad. The ultrasonic input device 858, which is an input device for generating an ultrasonic signal, may enable the electronic device 801 to sense a sound wave through a microphone (e.g., a microphone 888) so as to identify data, wherein the ultrasonic input device 858 is capable of wireless recognition. According to an embodiment, the electronic device 801 may use the communication module 820 so as to receive a user input from an external device (e.g., a computer or server) connected to the communication module 820.

The display 860 (e.g., the display 150) may include a panel 862, a hologram device 864, or a projector 866. The panel 862 may be, for example, a liquid crystal display (LCD) or an active-matrix organic light-emitting diode (AM-OLED). The panel 862 may be, for example, flexible, transparent, or wearable. The panel 862 and the touch panel 852 may be integrated into a single module. The hologram device 864 may display a stereoscopic image in a space using a light interference phenomenon. The projector 866 may project light onto a screen (not shown) so as to display an image. The screen may be arranged in the inside or the outside of the electronic device 801. According to an embodiment of the present disclosure, the display 860 may further include a control circuit for controlling the panel 862, the hologram device 864, or the projector 864.

The interface 870 may include, for example, an HDMI 872, a USB 874, an optical interface 876, or a D-subminiature 878. The interface 870 may be included in the communication interface 160 illustrated in FIG. 1. Additionally or alternatively, the interface 870 may include, for example, (not shown) a Mobile High-Definition link (MHL) interface, a SD card/Multi-Media Card (MMC) interface, or an Infrared Data Association (IrDA) interface.

The audio module 880 may convert a sound into an electrical signal or vice versa. At least a part of the audio module 880 may be included in the communication interface 140 illustrated in FIG. 1. The audio module 880 may process sound information input or output through a speaker 882, a receiver 884, an earphone 886, or the microphone 888.

According to an embodiment of the present disclosure, the camera module 891 for shooting a still image or a video may include (not shown) at least one image sensor (e.g., a front sensor or a rear sensor), a lens, an image signal processor, or a flash (e.g., an LED or a xenon lamp).

The power management module 895 may manage power of the electronic device 801. Although not illustrated, a Power Management Integrated Circuit (PMIC), a charger Integrated Circuit (IC), or a battery or fuel gauge may be included in the power management module 895.

The PMIC may be mounted on an integrated circuit or a SoC semiconductor. A charging method may be classified into a wired charging method and a wireless charging method. The charging IC may charge a battery, and may prevent an overvoltage or an overcurrent from being introduced from a charger. According to an embodiment, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, or a rectifier.

The battery gauge may measure, for example, a remaining capacity of the battery 896 and a voltage, current or temperature during charging. The battery 896 may store or generate electricity, and may supply power to the electronic device using the stored or generated electricity. The battery 896 may include, for example, a rechargeable battery or a solar battery.

The indicator 897 may include a specific state of the electronic device 800 or a part thereof (e.g., the AP 106 or 107), such as a booting state, a message state, or a charging state. The motor 898 may convert an electrical signal into a mechanical vibration. Although not illustrated, a processing device (e.g., a GPU) for supporting a mobile TV may be included in the electronic device 800. The processing device for supporting a mobile TV may process media data according to the standards of Digital Multimedia Broadcasting (DMB), Digital Video Broadcasting (DVB) or media flow.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 9:
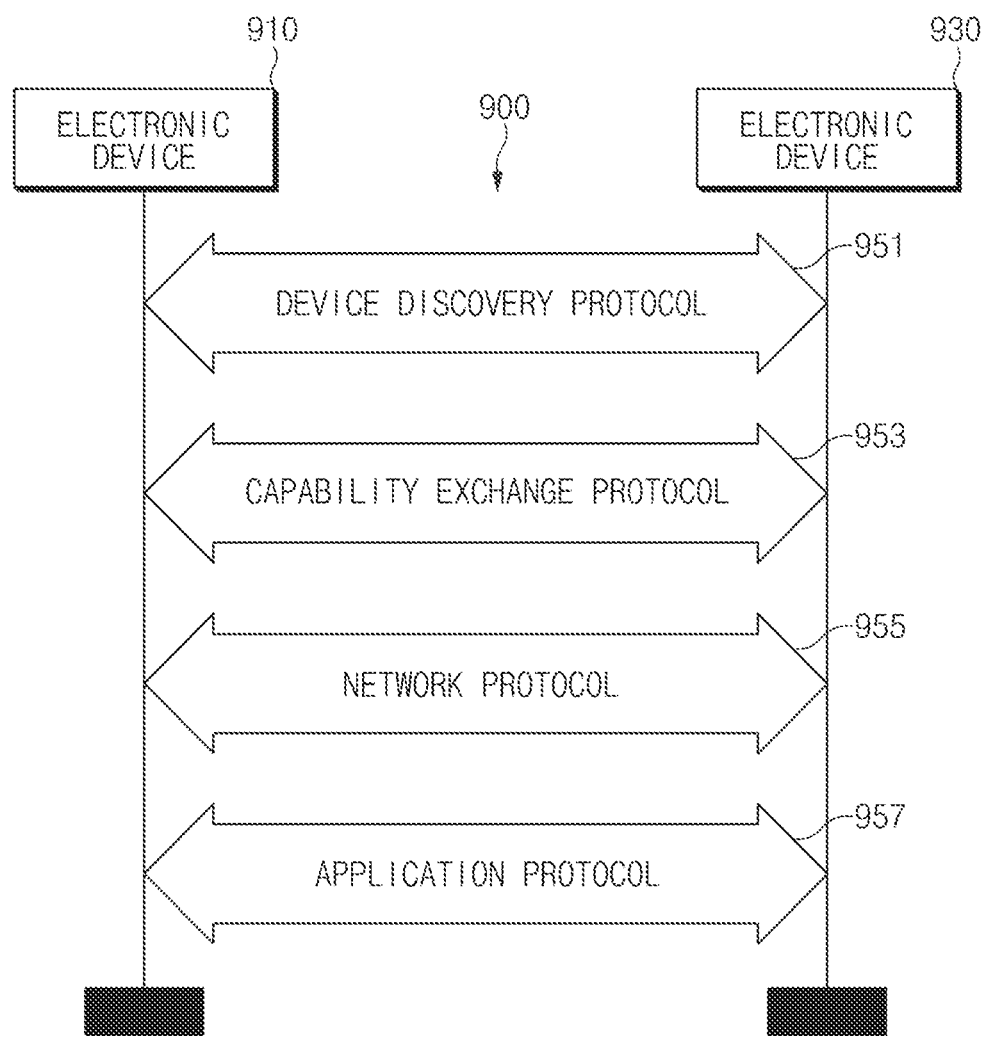
FIG. 9 is a diagram illustrating communication protocols between a plurality of electronic devices according to an embodiment of the present disclosure.

FIG. 9 illustrates a communication protocol 900 for communication between a plurality of electronic devices (e.g., an electronic device 910 and an electronic device 930). Referring to FIG. 9, the communication protocol 900 may include, for example, a device discovery protocol 951, a capability exchange protocol 953, a network protocol 955, and an application protocol 957.

According to an embodiment of the present disclosure, the device discovery protocol 951 may be a protocol for enabling an electronic device (e.g., the electronic device 910 or the electronic device 930) to detect an external electronic device communicable therewith or to be connected to a detected external electronic device. For example, the electronic device 910 (e.g., the electronic device 101) may use the device protocol 951 to detect the electronic device 930 (e.g., the electronic device 104) as a device communicable with the electronic device 910 by means of a communication technology (e.g., WiFi, BT or USB) usable by the electronic device 910. To establish a communication connection to the electronic device 930, the electronic device 910 may obtain and store identification information on the detected electronic device 930 using the device discovery protocol 951. The electronic device 910 may establish the communication connection to the electronic device 930 on the basis of at least the identification information.

According to some embodiments of the present disclosure, the device discovery protocol 951 may be a protocol for mutual authentication between a plurality of electronic devices. For example, the electronic device 910 may perform authentication between the electronic device 910 and the electronic device 930 on the basis of at least communication information (e.g., a MAC address, a Universally Unique Identifier (UUID), an SSID, and an Internet Protocol (IP) address) for connection to the electronic device 930.

According to an embodiment of the present disclosure, the capability exchange protocol 953 may be a protocol for exchanging information related to a function of a service supportable by at least one of the electronic device 910 and the electronic device 930. For example, the electronic device 910 and the electronic device 930 may exchange information related to functions of services that are currently provided by the electronic devices respectively, through the capability exchange protocol. Exchangeable information may include identification information indicating a specific service among a plurality of services supportable by the electronic device 910 and the electronic device 930. For example, the electronic device 910 may receive, from the electronic device 930, the identification information of a specific service provided by the electronic device 930 through the capability exchange protocol 953. In this case, the first electronic device 910 may determine whether the electronic device 910 is able to support the specific service.

According to an embodiment of the present disclosure, the network protocol 955 may be a protocol provided to control a flow of data transmitted or received in association with a service between electronic devices (e.g., the electronic device 910 and the electronic device 930) communicably connected to each other. For example, at least one of the electronic device 910 and the electronic device 930 may perform error control or data quality control using the network protocol 955. Additionally or alternatively, the network protocol 955 may determine a transmission format of data transmitted/received between the electronic device 910 and the electronic device 930. Furthermore, at least one of the electronic device 910 and the electronic device 930 may manage at least a session (e.g., session establishment or session termination) for exchanging data using the network protocol 955.

According to an embodiment of the present disclosure, the application protocol 957 may be a protocol for providing a procedure or information for exchanging data related to a service provided to an external electronic device. For example, the electronic device 910 (e.g., the electronic device 101) may provide a service to the electronic device 930 (e.g., the electronic device 104, the access point 106, or the server 164) through the application protocol 957.

According to an embodiment of the present disclosure, the communication protocol 900 may include a standard communication protocol, a communication protocol defined by an individual or an organization (e.g., a communication protocol defined by a communication device manufacturing company or a network provider company), or a combination thereof.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an Application-Specific Integrated Circuit (ASIC) chip, a Field-Programmable Gate Array (FPGA), and a programmable-logic device for performing some operations, which are known or will be developed.

According to various embodiments of the present disclosure, at least a part of devices (e.g., modules or functions thereof) or methods (e.g., operations) according to various embodiments may be implemented as instructions stored in a computer-readable storage medium in the form of a programming module. In the case where the instructions are performed by at least one processor (e.g., the processor 120), the at least one processor may perform functions corresponding to the instructions. The computer-readable storage medium may be, for example, the memory 130. At least a part of the programming module may be implemented (e.g., executed) by the processor 120. At least a part of the programming module may include, for example, a module, program, routine, sets of instructions, or process for performing at least one function.

The computer-readable storage medium may include a magnetic medium such as a hard disk, a floppy disk and a magnetic tape, an optical medium such as a Compact Disk ROM (CD-ROM) and a Digital Versatile Disc (DVD), a magneto-optical medium such as a floptical disk, and a hardware device configured to store and execute program instructions (e.g., programming module), such as a ROM, a RAM, and a flash memory. The program instructions may include machine language codes made by compilers and high-level language codes that can be executed by computers using interpreters. The above-mentioned hardware may be configured to be operated as one or more software modules for performing operations of various embodiments of the present disclosure and vice versa.

The module or programming module according to various embodiments of the present disclosure may include at least one of the above-mentioned elements, or some elements may be omitted or other additional elements may be added. Operations performed by the module, the programming module or the other elements may be performed in a sequential, parallel, iterative, or heuristic way. Furthermore, some operations may be performed in another order or may be omitted, or other operations may be added.

According to various embodiments of the present disclosure, instructions stored in a storage medium are executed by at least one processor so that at least one operation is performed by the at least one processor, wherein the at least one operation may include: an operation for recognizing an access point that relays a connection between an electronic device and an external network, an operation for determining whether the access point is moved on the basis of at least one of recognition information, signal information and network usage amount information of the access point and information of a fixed access point, and an operation for determining whether to connect the electronic device to the access point according to whether the access point is moved.

According various embodiments of the present disclosure, a connection between an electronic device and an access point may be selectively controlled on the basis of information of the access point, thereby improving the convenience of use.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an electronic device, the method comprising:
    recognizing an Access Point (AP) located within a threshold range in which signals are transmittable/receivable from the electronic device, in order to connect the electronic device to an external network;
    determining whether the access point is currently being moved in relation to the electronic device based on information related to at least one of the access point and the external network; and
    connecting the electronic device to the access point based on a result of the determining of whether the access point is currently being moved in relation to the electronic device.

2. The method according to claim 1, wherein the determining of whether the access point is currently being moved in relation to the electronic device comprises:
    checking whether the recognized access point is included in a list of one or more access points whose position is fixed among a plurality of access points located within the threshold range, and
    determining that the recognized access point is currently being moved in relation to the electronic device if the recognized access point is not included in the list.

3. The method according to claim 2, wherein the checking of whether the recognized access point is included in the list of one or more access points comprises:
    obtaining the list from an external server or a storage medium functionally connected to the electronic device, based on a location of the electronic device.

4. The method according to claim 1, wherein the determining of whether the access point is currently being moved in relation to the electronic device comprises:
    measuring a change of a distance between the access point and the electronic device, and
    determining that the access point is currently being moved in relation to the electronic device if the distance change exceeds a threshold value.

5. The method according to claim 4, wherein the measuring of the change of the distance between the access point and the electronic device comprises:
    measuring the change based on a strength of a signal received from the access point.

6. The method according to claim 4, wherein the measuring of the change of the distance between the access point and the electronic device comprises:
    measuring a Doppler effect of a signal received from the access point.

7. The method according to claim 1, wherein the determining of whether the access point is currently being moved in relation to the electronic device comprises:
    measuring an amount of network usage of the access point, and
    determining that the access point is currently being moved in relation to the electronic device if there is a change of the network usage amount by a threshold amount.

8. The method according to claim 7, wherein the change of the network usage amount comprises:
    an increase of the network usage.

9. The method according to claim 1, wherein the determining of whether the access point is currently being moved in relation to the electronic device comprises: checking whether the access point uses a frequency channel of which a usage amount has changed among a plurality of frequency channels allocated to the external network, and
    determining that the access point is currently being moved in relation to the electronic device if the access point uses the frequency channel of which the usage amount has changed.

10. The method according to claim 9, wherein the change of the usage amount comprises:
    an increase in the usage amount.

11. The method according to claim 1, wherein the connecting of the electronic device to the access point is further based on:
    determining whether the electronic device is located within a transport vehicle if the access point is currently being moved in relation to the electronic device, and
    allowing the connection if the electronic device and the access point are located within the transport vehicle.

12. The method according to claim 11, wherein the determining of whether the electronic device is located within the transport vehicle is based on whether a moving speed of the access point exceeds a threshold value.

13. The method according to claim 11, wherein the determining whether the electronic device is located within the transport vehicle is based on at least one of:
a moving speed of the electronic device, and
fee payment information of the electronic device.

14. The method according to claim 13, wherein the fee payment information is received from an external server or obtained from a storage medium functionally connected to the electronic device.

15. The method of claim 11, wherein the determining of whether the electronic device is located within the transport vehicle is based on an identifying text included in a signal from the access point.

16. An electronic device comprising:
at least one processor; and
at least one memory for storing one or more computer programs configured to be executed by the at least one processor, the one or more computer programs including instructions for:
recognizing an Access Point (AP) located within a threshold range in which signals are transmittable/receivable from the electronic device, in order to connect the electronic device to an external network,
determining whether the access point is currently being moved in relation to the electronic device based on information related to at least one of the access point and the external network, and
connecting the electronic device to the access point based on a result of the determining of whether the access point is currently being moved in relation to the electronic device.

17. The electronic device according to claim 16, wherein the one or more computer programs further comprise:
instructions for obtaining recognition information of the access point connectable to the electronic device within a threshold distance from the electronic device.

18. The electronic device according to claim 16, wherein the one or more computer programs further comprise:
instructions for determining whether the access point is currently being moved in relation to the electronic device based on the recognition information of the access point.

19. The electronic device according to claim 16, wherein the one or more computer programs further comprise:
instructions for determining that the recognized access point is currently being moved in relation to the electronic device if the recognized access point is not included in a list of one or more fixed access points among a plurality of access points located within the threshold range.

20. The electronic device according to claim 16, wherein the one or more computer programs further comprise:
instructions for measuring a change of a distance between the access point and the electronic device to determine that the access point is currently being moved in relation to the electronic device if the change exceeds a threshold value.

21. The electronic device according to claim 20, wherein the measuring of the change of the distance between the access point and the electronic device is based on a strength of a signal received from the access point.

22. The electronic device according to claim 20, wherein the measuring of the change of the distance between the access point and the electronic device is based on a Doppler effect of a signal received from the access point.

23. The electronic device according to claim 16, wherein the one or more computer programs further comprise instructions for:
receiving information of a fixed access point from outside of the electronic device based on a location of the electronic device, and
determining whether the access point is moved in relation to the electronic device based on a comparison with the received information of the fixed access point.

24. The electronic device according to claim 23, wherein the information of the fixed access point comprises:
a list of fixed access points.

25. The electronic device according to claim 16, wherein the one or more computer programs further comprise instructions for:
determining whether the electronic device is located in a transport vehicle, and
connecting the electronic device to an access point located in the transport vehicle if the electronic device and the access point are located in the transport vehicle.

26. The electronic device according to claim 16, wherein the one or more computer programs further comprise instructions for:
receiving, from a user, an input about whether to connect the electronic device to the access point, and
controlling a connection between the electronic device and the access point, when the access point is currently being moved in relation to the electronic device.

27. A non-transitory computer-readable storage medium configured to store one or more computer programs including instructions that, when executed by at least one processor, cause the at least one processor to control for:
recognizing an access point that relays a connection between an electronic device and an external network;
determining whether the access point is currently being moved in relation to the electronic device based on at least one of recognition information, signal information, and network usage amount information of the access point and information of a fixed access point; and
connecting the electronic device to the access point based on a result of the determining of whether the access point is currently being moved in relation to the electronic device.

* * * * *